March 17, 1959 R. J. SHANK ET AL 2,878,466
DISTURBED LINE-OF-SIGHT FIRE CONTROL SYSTEM
Filed Oct. 6, 1951 10 Sheets-Sheet 3

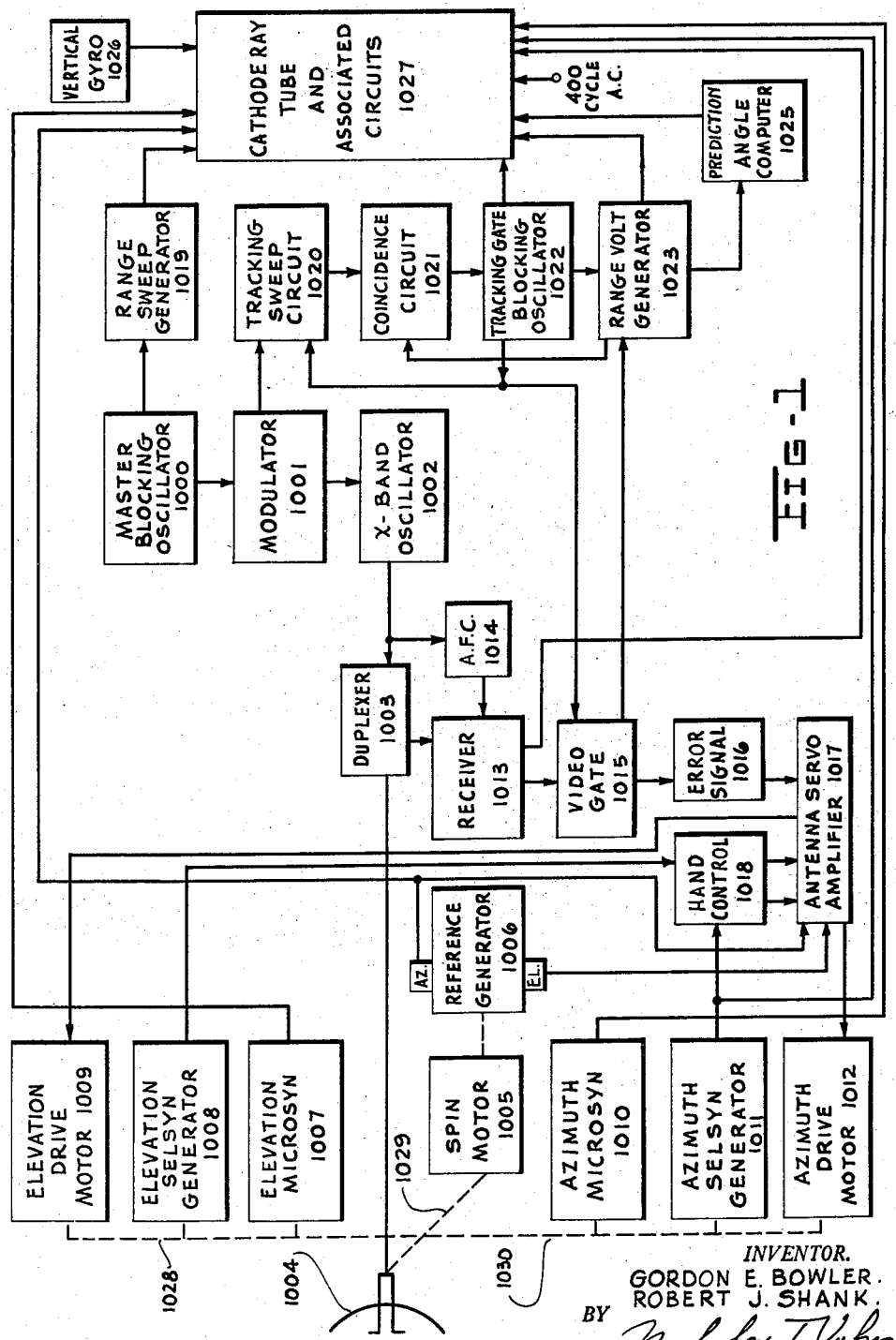

INVENTORS.
GORDON E. BOWLER.
ROBERT J. SHANK.
BY Nicholas T Vohr
atty.

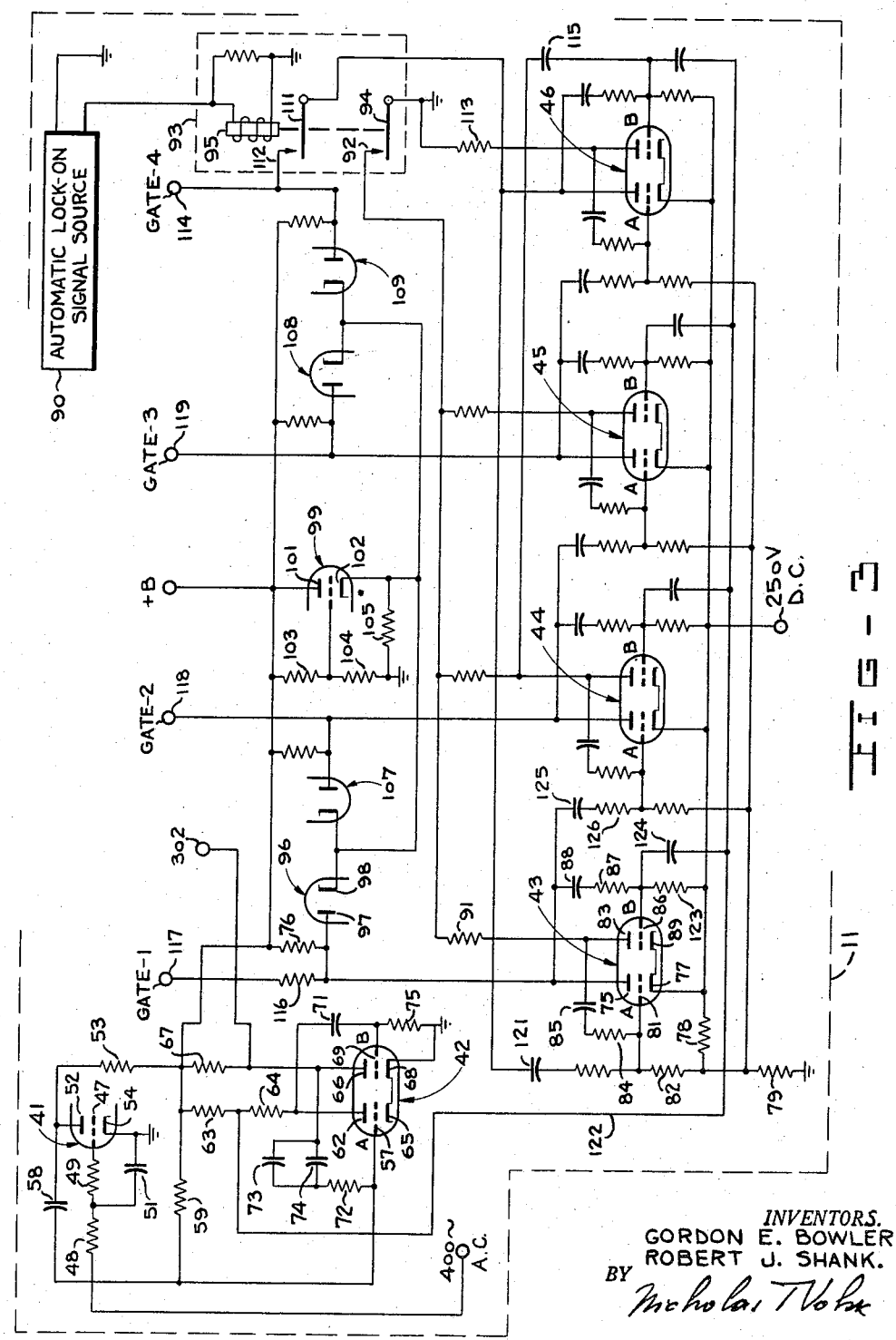

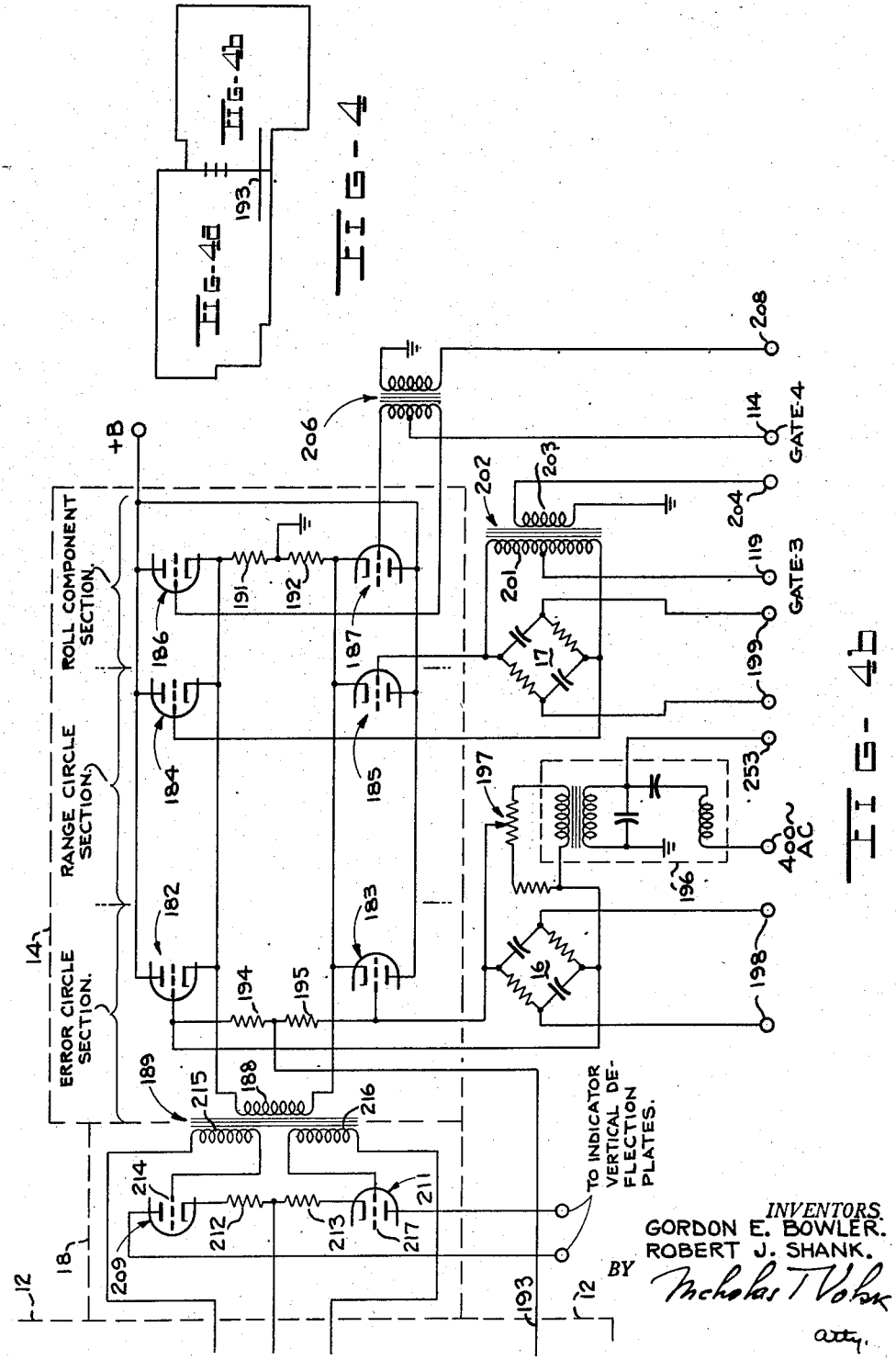

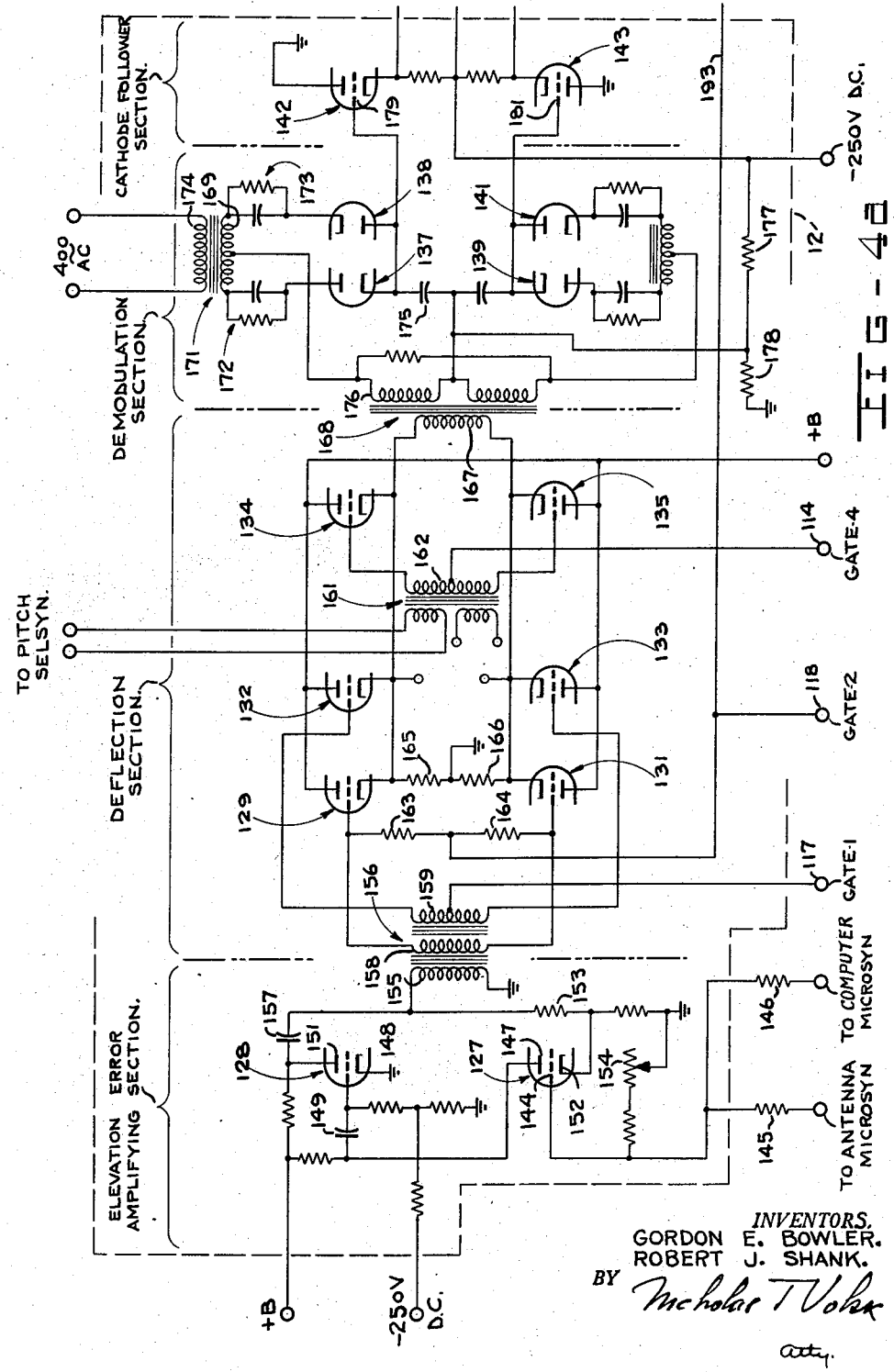

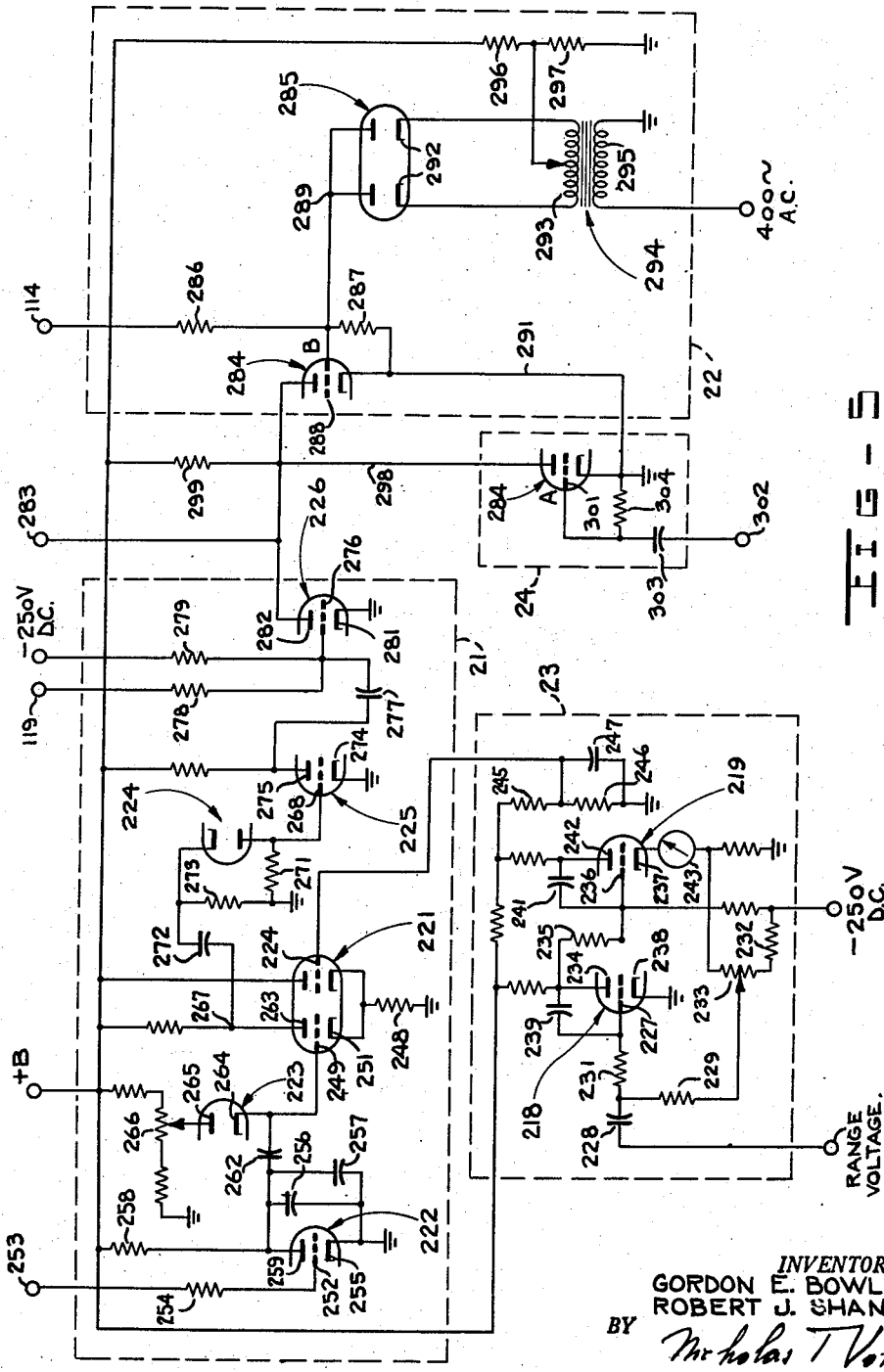

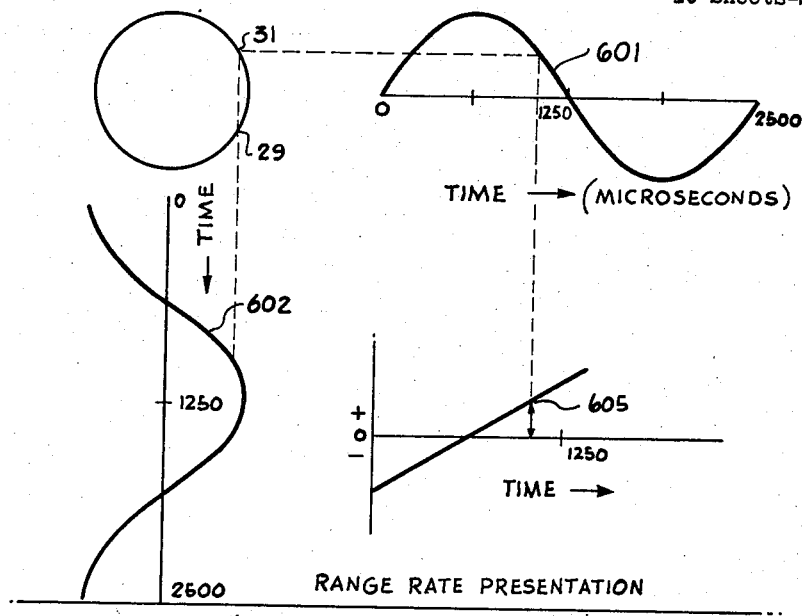
RANGE RATE PRESENTATION
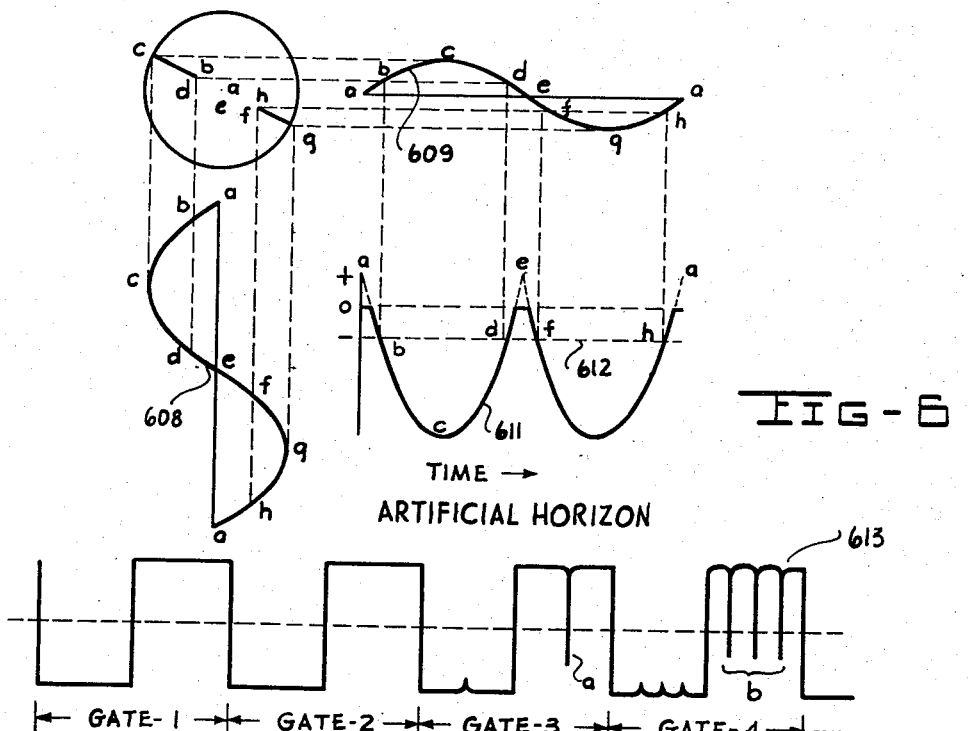
ARTIFICIAL HORIZON
FIG-6

March 17, 1959     R. J. SHANK ET AL     2,878,466
DISTURBED LINE-OF-SIGHT FIRE CONTROL SYSTEM
Filed Oct. 6, 1951                                  10 Sheets-Sheet 9

FIG-7

INVENTOR.
GORDON E. BOWLER.
ROBERT J. SHANK.
BY
att.

INVENTORS,
GORDON E. BOWLER,
BY ROBERT J. SHANK,

Nicholas T Vohs
THEIR ATTORNEY.

United States Patent Office 2,878,466
Patented Mar. 17, 1959

2,878,466
DISTURBED LINE-OF-SIGHT FIRE CONTROL SYSTEM

Robert J. Shank, Encino, and Gordon E. Bowler, Los Angeles, Calif., assignors, by mesne assignments, to Hughes Aircraft Company, a corporation of Delaware Application October 6, 1951, Serial No. 250,042

15 Claims. (Cl. 343—7)

The present invention relates to a disturbed line-of-sight fire control system and more particularly to the combination of a radar search, tracking system and attack display operating in conjunction with a gun sight computer. A disturbed line of sight fire control system provides an apparent line of sight that is deflected, i. e., "disturbed," with respect to the actual line of sight from the attacker to the target, in such manner that if the armament of the attacker is aimed along the apparent line of sight and fired, the target will be hit.

Although the fire control system is applicable to any moving craft, it will be exemplified herein connection with its application to an aircraft to furnish information enabling the pilot of an interceptor aircraft to locate a target and maneuver the pursuing aircraft for launching an attack upon the selected target utilizing deflection gunnery in the light of the gunnery information furnished by the system. The operation of attacking a target that is moving relative to the attacker generally consists of two distinct phases, one followed by the other. The first is that of discovering and locating the target, and it is referred to hereinafter as the "search phase." The second is that of guiding the attacking craft toward a position with respect to the selected target such that if the guns were fired, the target would be hit. This is called the "tracking phase." At the end of the tracking phase, it is necessary not only that the attacking craft be near enough to the target to score a hit, i. e., within range of the guns, but also, that the guns be pointed so that their projectiles will arrive at some point in the path of the target at the same time as the target gets there.

Under good visibility conditions, the search phase of an attack may be accomplished visually by the personnel of the attacking craft. The tracking phase may then be carried out by means of prior art fire control systems of the disturbed line of sight type, which employ optical sights. However, when targets are obscured by darkness or adverse weather conditions, the search function must be effected by non-visual means, such as radar.

Specialized radar systems have been developed for use in interceptor aircraft for this purpose. Such radar systems may also enable the attacker to perform part of the tracking phase, by flying a course that is continuously headed toward the target. This type, of course, which is known as a "pursuit" course, does not involve any element of prediction of the position of the target, and therefore generally leads merely to a decrease of distance between the attacker and the target. Thus, the radar system provides only for the approach to the target, and the final part of the tracking phase must be completed by visual means.

According to the present invention, a radar system is arranged to operate during the search phase to scan periodically through a large sector of space ahead of the attacker craft, controlling an indicator system to provide a visual display showing the azimuth and range of each target in said sector on the screen of a cathode ray tube. The same radar and indicator systems are arranged to operate during the tracking phase in a different mode, in conjunction with a computer device, to produce electronically a disturbed line of sight indication on the cathode ray tube. The radar system functions as the sighting means throughout the tracking phase of the attack, thus avoiding requirement of target visibility.

One of the principal objects of the present invention is to provide an integrated fire control system that is useful throughout the entire operation of an attack, from the beginning of the search phase to the end of the tracking phase, up to and including the firing period.

Another important object is to provide a system of the foregoing type that can be used effectively under all visibility conditions.

A further object of this invention is to provide a fire control system which produces guidance and other information for the use of the personnel of an attacking aircraft, in the form of a composite and coordinated visual display that is simply and readily interpretable, thus requiring a minimum of mental concentration by the pilot, and freeing him to devote some of his attention to other matters such as may arise during the course of attack.

The novel features which are believed to be characteristic of the invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only, and are not intended as a definition of the limits of the invention.

Fig. 1 is a block diagram of the disturbed line-of-sight fire control system according to the present invention;

Fig. 3 is a schematic diagram of one form of the gate generating circuit of Fig. 1a;

Fig. 4 (Figs. 4a and 4b) is a schematic diagram of one form of a deflection channel of Fig. 1a;

Fig. 5 is a schematic diagram of the various blanking circuits of Fig. 1;

Fig. 6 is a group of illustrations describing the waveforms necessary for the presentation of the range circle, range rate blanking, the artificial horizon, and the attack cathode ray tube gating and blanking waveform;

Fig. 7 is a composite diagram of the waveforms of signals appearing at various points in the circuits of Fig. 3;

While the disclosed system need not, necessarily, be used with fixed guns, i. e., where the guns are in fixed position with respect to the longitudinal axis of the aircraft, it nevertheless will be described here in connection with fixed guns for the sake of simplicity. When this is the case, the guns are substantially parallel to the longitudinal axis of the craft, and are aimed by flying the aircraft with its heading in the required direction of aim.

Figure 9:
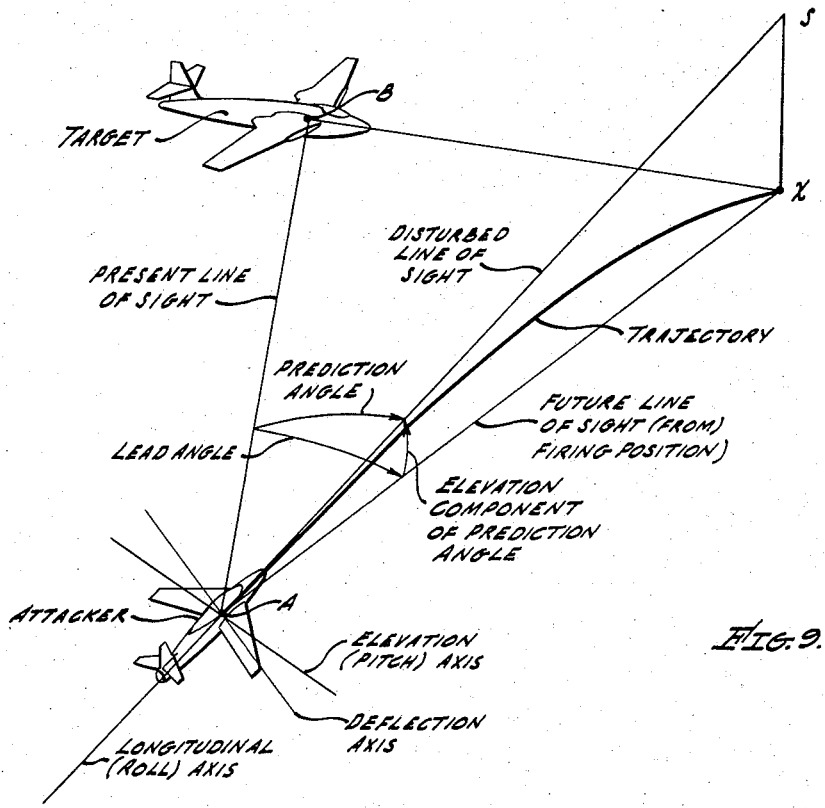
Fig. 9 is a perspective view of an attacker craft and its target, showing the reference axes of the fire control system and their relationship to the target course.

In order for a projectile fired from a gun to hit a target that is moving relative to the gun, the gun must be aimed so that the initial velocity vector of the projectile is at a certain angle with respect to the present line of sight, i. e., the line from the gun to the target at the instant of firing. This angle is called the prediction angle. Referring to Fig. 9, the attacker is at A and the target is at B. The course of the target is along the line B—X. The present line of sight is the line A—B. During the time of flight of a projectile fired from the attacker at the point A, the target will move from B to X. The line A—X is the future line of sight, and the angle between the present line of sight and the future line of sight is the lead angle, or deflection component of the prediction angle. The prediction angle also includes an elevation component, which consists principally of a correction for the gravity drop of the projectile.

The elevation component of the prediction angle is measured about the elevation or pitch axis of the attacker craft. The lead component is measured about the deflection axis, which is perpendicular to the elevation axis and to the longitudinal axis, or roll axis, of the craft. With fixed guns having their boresights substantially parallel to the longitudinal axis, the attacker craft must be heading, at the instant of firing, along the line A—S, which is at the prediction angle with respect to the present line of sight.

The course that would be flown by an attacker if it were continuously guided so as to maintain its heading at the current prediction angle, is termed a "lead pursuit" course. The previously mentioned "pursuit" course is the one that would be followed if the attacker were kept continuously headed along the present line of sight. In the tracking phase of operation of the present system, the attacker is guided to follow a pursuit course during the first part of the phase, until the range has decreased to some predetermined value that is still somewhat beyond the maximum firing range of the guns. Then the course is altered to a lead pursuit course, and the attacker follows this course up to and throughout the firing period.

Figure 8:
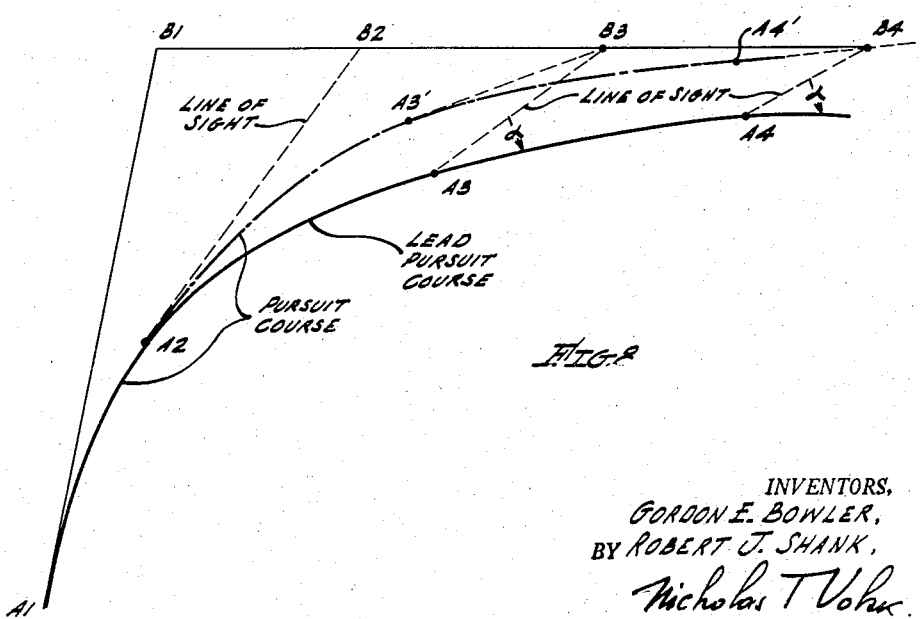
Fig. 8 is a plan view of a typical lead pursuit course as followed by an interceptor aircraft using the disclosed system in an attack on a moving target, such as another aircraft.

Referring to Fig. 8, assume the initial position (in the first part of the tracking phase) of the attacker to be at A1, and that of the target to be at B1. The attacker follows a simple pursuit course from A1 to a point A2, while the target moves from B1 to B2. Throughout this period the attacker maintains its heading along the present line of sight, as indicated, for example, by the dotted lines A2—B2. After it reaches the point A2, the attacker changes its course to a lead pursuit course, shown by the solid line continuation from the point A2. When the target is at B3, the attacker is at A3, headed at an angle $\alpha$ with respect to the line of sight A3—B3. In the plan view of Fig. 8, $\alpha$ is the lead component of the prediction angle. Similarly, at point A4 and successive points along its lead pursuit course, the attacker will be headed at an angle $\alpha$ to the current line of sight. As the target comes within range of the guns, firing may begin and continue until the target is destroyed or until the attack must be broken off due to danger of collision.

For purpose of comparison, a continuation of the pursuit course is shown in alternate dots and dashes in Fig. 8, with successive attacker positions A3', A4' corresponding to the target positions B3, B4. Here it is seen that the heading always coincides with the line of sight, so that the only possible position for effective firing with fixed guns will occur when the attacker course approaches coincidence with the target course, with the attacker following the target directly.

Referring now to Fig. 1, the radar system includes a directive antenna unit 1004 that is mounted for rotation in elevation and in azimuth by elevation and azimuth motors 1009 and 1012.

The elevation drive motor 1009, an elevation selsyn generator 1008, and an elevation microsyn 1007 are mechanically coupled to the antenna unit 1004 by a mechanical linkage 1028. The linkage 1028 is designed so that the elevation drive motor 1009 will raise or lower the antenna unit 1004 in elevation, the elevation selsyn generator 1008 and the elevation microsyn 1007 producing electrical signals corresponding to the position in elevation of the antenna unit 1004.

The azimuth drive motor 1012, an azimuth selsyn generator 1011, and an azimuth microsyn 1010 are mechanically coupled to the antenna unit 1004 by a mechanical linkage 1030. The linkage 1030 is designed so that the azimuth drive motor 1012 will turn the antenna unit 1004 in azimuth, the azimuth selsyn generator 1011 and the azimuth microsyn 1010 producing electrical signals corresponding to position in azimuth of the antenna unit 1004. The antenna 1004 is connected through a duplexer 1003 to a receiver 1013 and to a transmitter comprising a high frequency oscillaor 1002, a modulator 1001, and a master blocking oscillator 1000. The receiver is provided with an automatic frequency control circuit 1014. The output circuit of the receiver 1013 is connected to an indicator system consisting of a cathode ray tube and associated circuits 1027. It is also coupled through a video gate circuit 1015 to an error signal detector, which in turn is connected to a servo amplifier circuit 1017.

The servo amplifier 1017 has two outputs, connected respectively to the elevation and azimuth drive motors 1009 and 1012. Input signals representing the position of the antenna in elevation and azimuth are supplied to the servo amplifier by selsyn generators 1008 and 1011 respectively, which are connected to the servo amplifier through a hand control device 1018. The hand control 1018 is arranged to modify the "repeat back" signals from the selsyns 1008 and 1011 in accordance with the position of a manually operable control handle.

A part of the feed structure of the antenna 1004, such as a primary reflector disk, is tilted at a small angle with respect to the axis of symmetry of the antenna as a whole, and is mechanically coupled by means 1029 to a spin motor 1005, for continuous rotation at a speed of, for example, 35 revolutions per second. This makes the antenna beam scan in a narrow conical pattern about the axis of symmetry. A two-phase reference generator 1006 is also coupled to the spin motor 1005, and positioned so that one of its outputs corresponds to the instantaneous displacement of the antenna beam from the axis of symmetry in elevation, and the other output corresponds to the displacement in azimuth. The outputs of the reference generator 1006 are applied to phase detectors in the servo amplifier 1017, for comparison with the output of the error signal detector 1016 to produce control signals for the drive motors 1009 and 1012, during automatic tracking operation of the radar system.

The radar includes a range tracking system comprising a tracking sweep circuit 1020, a coincidence circuit 1021, a range tracking gate blocking oscillator 1022, and a range voltage generator 1023. The tracking sweep circuit 1020 has two inputs connected respectively to the modulator 1001 and the tracking gate blocking oscillator 1022, and is designed to produce an output voltage that changes uniformly as a function of time, starting in response to an input pulse from the modulator 1001 and stopping in response to a pulse from the oscillator 1022. The output of the sweep circuit 1020 goes to the coincidence circuit 1021. The coincidence circuit 1021 is also connected to the range voltage generator 1023, and is designed to produce an output signal when the voltage from the tracking sweep circuit reaches coincidence (i. e., equality) with that furnished by the range voltage generator 1023. The output of the coincidence circuit 1021 goes to the range tracking gate blocking oscillator to trigger it and produce a gate pulse upon each occurrence of coincidence.

The oscillator 1022, besides being connected to the tracking sweep circuit, also supplies the range gate signal to the video gate 1015, the indicator system 1027, and the range voltage generator 1023. The generator 1023 has another input circuit connected to the output of the video gate 1015, and is designed to compare the timing of pulses that pass through the gate 1015 with those from the tracking gate blocking oscillator to produce an error signal which is integrated to provide a range voltage output. This output is supplied to the coincidence circuit 1021 as already described, and the generator 1023 is also connected to supply range voltage to the indicator system 1027 and to a prediction angle computer 1025.

The described radar system may be operated in any of three modes, i. e., search, manual, or track, as selected by the operator. In the search mode, the automatic antenna positioning system is disabled, as by manual operation of switches to disconnect the error signal detector 1016 from the servo amplifier 1017. For automatic search scanning, the motors 1009 and 1012 are connected to a power source through limit stop reversing switches in known manner to drive the antenna periodically from left to right and up and down to sweep throughout a solid sector of space.

Each pulse from the master blocking oscillator 1000 triggers the modulator 1001, energizing the high frequency oscillator 1002 to produce a brief pulse of radio frequency energy which goes through the duplexer 1003 and is radiated by the antenna 1004. A reflecting target in the path of the antenna beam will cause part of the transmitted pulse energy to return to the antenna, where it is picked up and conducted through the duplexer 1003 to the receiver 1013, amplified, detected, and applied to the intensity control electrode of the cathode ray tube in the indicator 1027.

The indicator system includes a range sweep generator 1019 designed to produce a sawtooth wave voltage in synchronism with the output of the master blocking oscillator 1000, to which it is connected. This sawtooth wave is applied to the vertical deflection system of the cathode ray tube, and the azimuth selsyn generator 1011 is coupled to the horizontal deflection system during operation of the radar in the search mode. As the antenna is moved back and forth in azimuth, the beam of the cathode ray tube is swept correspondingly from left to right; and as each pulse is transmitted, the beam moves vertically from the bottom of the cathode ray tube screen toward the top. Each received pulse intensifies the beam momentarily, thus producing a graphical display on the screen wherein the range of each target within the scanning sector is indicated by the ordinate of the corresponding bright spot, and the azimuth is indicated by the abscissa.

The manual mode of operation of the system is substantially the same as the automatic search mode, except that the motors 1009 and 1012 are connected to the servo amplifier 1017, and controlled by manual operation of the hand control 1018, which modifies the repeat-back signals and thus in effect varies the reference or equilibrium positions of the elevation and azimuth servo loops. In addition, a range marker signal is produced in the indicator system 1027 and applied to the cathode ray tube so as to provide a mark on the screen at a vertical position corresponding to the magnitude of the output of the range voltage generator 1023. For operation in this mode, the range voltage generator is arranged to produce a voltage that varies cyclically and slowly, for example, once per second, between lower and upper limits that can be selected by the operator.

The operator selects a target by moving the antenna in azimuth and elevation, while observing the cathode ray indicator, to "searchlight" the target with the antenna beam. Then he adjusts the sweep of the range voltage generator so that the selected target mark is bracketed by the scanning limits of the range marker. The system can then be thrown into the tracking mode of operation by connecting the error signal generator 1016 to the servo amplifier 1017.

In the automatic tracking mode of operation, the tracking gate blocking oscillator 1022 produces a gate pulse that is substantially simultaneous with the return or echo pulse from the selected target. This gate pulse opens the video gate circuit 1015 to let the selected target pulse go to the range voltage generator 1023 and the error signal detector 1016. Whenever the axis of symmetry of the antenna unit 1004 deviates slightly from the line of sight to the selected target, the pulses from the video gate 1015 vary in amplitude, i. e., the pulse train is modulated at the spin frequency.

This modulation is detected and converted by the error signal detector 1016 to an A. C. wave of spin frequency which is compared in the phase detectors of the servo amplifier 1017 with elevation and azimuth reference signals from the generator 1006 to produce elevation and azimuth error signals. These error signals are amplified and applied to the motors 1009 and 1012, to drive the antenna 1004 to a position such that its axis of symmetry coincides with the line of sight to the target. This reduces the amplitude modulation of the received pulses substantially to zero and cancels the error signals. Thus, the antenna is maintained substantially continuously pointed at the selected target.

The tracking sweep circuit 1020 is triggered by a synch pulse derived from the modulator 1001 in coincidence with the pulsing of the high frequency oscillator 1002. This starts the range sweep voltage wave, which increases uniformly until it becomes equal in magnitude to the range voltage produced by the generator 1023. At that instant, the coincidence circuit 1021 triggers the tracking gate blocking oscillator 1022 to produce the range gate pulse which, besides opening the video gate 1015, stops the range sweep, and also goes to the range voltage generator 1023.

The range voltage generator compares the time of arrival of the selected video pulse with that of the gate pulse; if the video pulse is late with respect to the range gate, the range voltage is increased gradually, step by step with each pulse. This makes the time at which the range sweep voltage reaches equality with the range voltage occur progressively later during the pulse repetition period, thus making the gate pulse later, until the gate pulse coincides with the video pulse. Similarly, if the video pulse is early with respect to the gate, the range voltage changes to again bring the gate pulse into coincidence. In this manner, the magnitude of the range voltage is maintained in substantial equality with the value of the range sweep voltage that corresponds to the range of the selected target, and thus is a measure of the range.

The prediction angle computer 1025 furnishes signals representing the elevation and lead components of the prediction angle (see Fig. 9). Said elevation and lead signals are applied to the indicator circuitry 1027 during tracking operation of the system as will be described. A vertical gyro 1026 is connected to furnish pitch and roll signal voltages to the indicator 1027.

Summarizing the inputs to the indicator system 1027, they comprise a voltage proportional to range from the range voltage generator 1023, a range sweep from range sweep generator 1019, video from receiver 1013, pitch and horizontal and vertical roll components in the form of signal voltages from the vertical gyro 1026, azimuth reference voltage from reference generator 1006, a tracking gate from the tracking gate blocking oscillator 1022 and signals from the azimuth selsyn generator 1011. Additional inputs to the indicator during the tracking phase are the instantaneous angular position of the target with respect to the longitudinal axis of the aircraft in the form of horizontal and vertical component voltages from the antenna azimuth microsyn 1010 and the antenna elevation microsyn 1007, respectively, plus the horizontal and vertical components of the prediction angle for a lead pursuit course to the target relative to the longitudinal axis of the aircraft from the computer 1025.

Figure 1A:
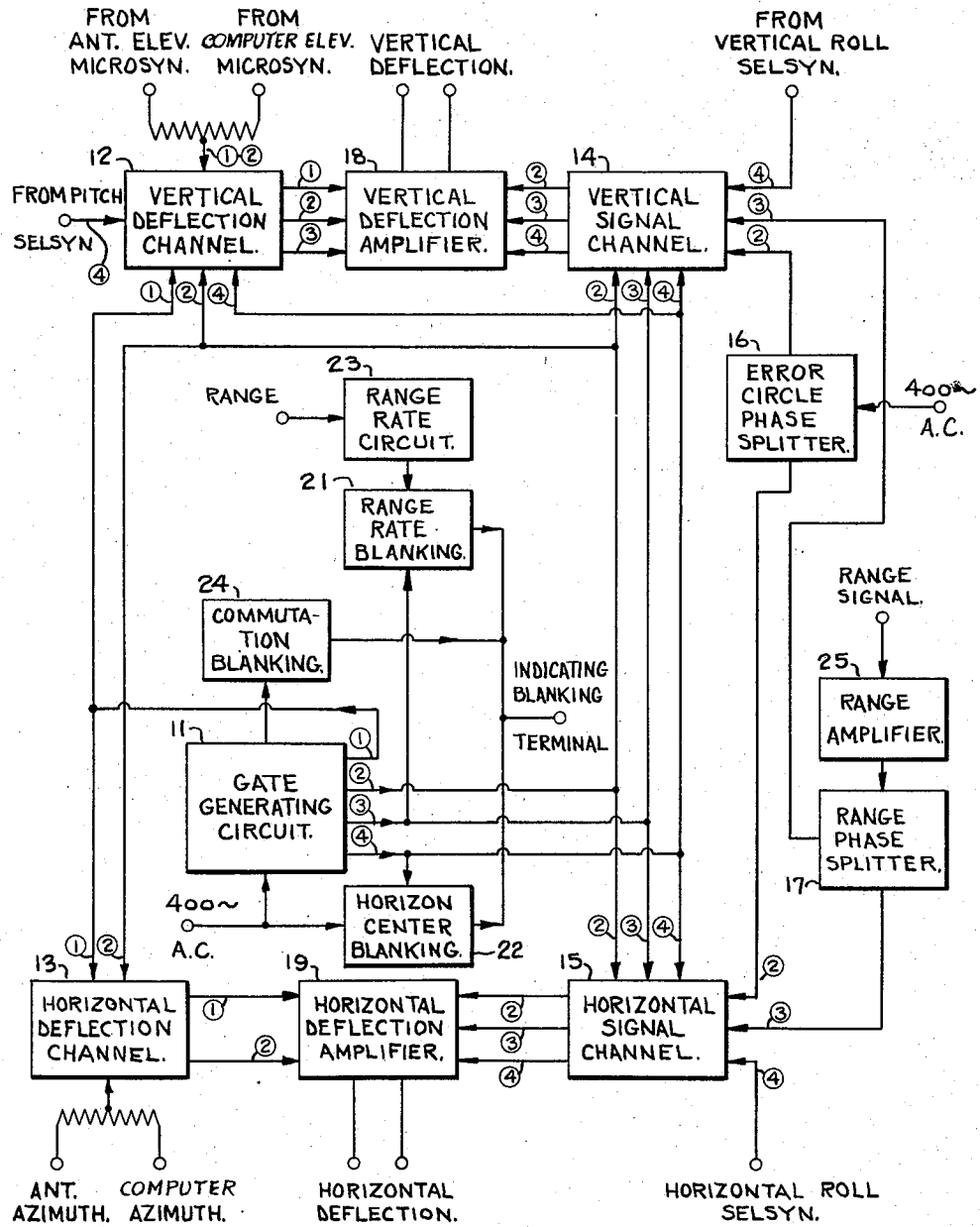
Fig. 1a is a block diagram of the display circuit.

The indicator 1027 comprises circuitry for a conventional type B scan wherein the inputs from the range sweep generator 1019, azimuth reference generator 1006, tracking gate blocking oscillator 1022, azimuth selsyn generator 1011, and video from receiver 1013 are utilized during the automatic search and manual modes of operation, as described above. The remaining indicator circuitry, termed the attack display circuitry, is used in the tracking phase to provide a disturbed line of sight indication for the attacker pilot and is illustrated in Fig. 1A. The inputs to the attack display circuitry comprise the antenna horizontal and vertical position signals, horizontal and vertical components of the prediction angle from the lead angle computer 1025, pitch and horizontal and vertical roll components from the vertical gyro 1026, 400 cycle alternating current, and the range signal from the range voltage generator 1023.

Referring to Fig. 1A, the attack display circuit comprises a gate generating circuit 11 operating from a 400-cycle alternating-current reference supply to govern the time-sharing of the four displays on the pilot's indicator. Circuit 11 produces a series of four positive gates in rotation, which actuate the switching circuits in each of vertical and horizontal deflection channels 12 and 13, respectively, and vertical and horizontal signal channels 14 and 15, respectively.

Vertical deflection channel 12 combines the outputs from the antenna elevation microsyn 1007, and an elevation microsyn located in the computer 1025, and amplifies and demodulates the combined signals to produce a vertical deflecting signal for the cathode ray tube. The elevation microsyn in the computer provides an electrical signal proportional to the elevation component of the computed prediction angle.

Although the computer used with this disturbed line-of-sight fire control system is of conventional type, the principles of its operation will be reviewed. The computer includes vertical and horizontal rate gyros with springs to keep the gimbals lined up with the longitudinal and vertical axis of the aircraft. On the precession axis of each gyro are mounted a torque motor and a stiffness motor. The field current of each stiffness motor is made to increase inversely with the logarithm of the range, effectively increasing the spring constant for rotation about the precession axis of each gyro. The torque motor applies a torque to the gyro gimbal directly proportional to the current flowing through its armature, this current being a function of the amount of precession.

The calibration of the computer is such that as the pursuit aircraft flies a curved course toward the target, the rate gyros will precess by amounts corresponding to the elevation and lead angle corrections necessary to fly a lead-pursuit course. On the precession axis of each rate gyro is mounted a microsyn termed the elevation and azimuth microsyns furnishing, respectively, signals that correspond to the elevation and lead components of the prediction angle.

Since the elements of a lead-pursuit course are functions of the type of armament, the range servo furnishing excitation to the stiffness motors must be consistent with the caliber and type of guns used on the aircraft.

Summarizing, the inputs to the prediction angle computer comprise range voltage information from the radar, and angular rate information from the turning of the aircraft about its elevation and deflection axes. In turn, the computer furnishes two voltages proportional to the elevation and lead components of the prediction angle for a lead-pursuit course to the indicator circuitry 1027 and more specifically to the attack circuitry of Fig. 1A.

The antenna elevation microsyn 1007 and the antenna azimuth microsyn 1010 furnish elevation and azimuth voltages during the tracking phase representing the angular position of the target relative to the longitudinal axis of the pursuit aircraft. These elevation and azimuth position angle voltages are combined respectively with the elevation and lead angle voltages provided by the computer in such a manner as to give the elevation and lead angle error voltages. The manner in which these signals modify the presentation on the pilot's indicator is described below.

In addition to the output from the antenna elevation microsyn 1007 and the computer elevation microsyn, channel 12 also receives a signal from a pitch axis selsyn on a conventional vertical gyro 1026 of the aircraft. This signal is demodulated in channel 12 to produce the pitch component signal of the artificial horizon display. As explained below, the output signals of channel 12 are produced in rotation on a time-sharing basis by the gating action of circuit 11. It should be emphasized at this point that the indicator circuitry 1027 and more specifically the attack display circuitry of Fig. 1A will accept the computed components of any attack course as long as consistent conversion constants are used (i. e. volts/degree). One can readily see that if the antenna is tracking a target and if an attack course were computed relative to the target relative to the aircraft, the difference of the respective horizontal and vertical components will be zero when the aircraft is proceeding on the attack course. Any deviation from the attack course will result in an error with a corresponding error signal.

Vertical signal channel 14 receives and demodulates input signals from an error circle phase splitter 16, a range circle phase splitter 17, and the vertical component of roll from the roll axis selsyn on the vertical gyro 1026. The time-sharing gates of channel 14 are actuated by circuit 11 to select each of these signals in rotation as required for the display. A vertical deflection amplifier 18 superimposes the sinusoidal output signals from channel 12 upon the deflection voltages obtained by demodulation in channel 14, amplifies the resulting signals, and transmits them to the vertical deflection plates of the pilot's indicator.

Horizontal deflection channel 13 combines the output signals from the antenna and computer azimuth microsyns, amplifies and demodulates the combined signals, and produces horizontal deflection components for the error dot and error circle on the pilot's indicator. Horizontal signal channel 15 receives signals from phase splitters 16 and 17, and the horizontal roll axis selsyn on the vertical gyro, and selectively applies the signals to a horizontal deflection amplifier 19, as determined by circuit 11. Amplifier 19 superimposes the sinusoidal output signals from channel 15 upon the deflection voltages obtained by demodulation in channel 13, amplifies the resulting signals and transmits them to the horizontal plates of the pilot's indicator.

A range rate blanking circuit 21 has its output terminal connected to the control grid of the pilot's indicator in order to blank the indicator momentarily as the beam which is sweeping out the range circle passes the desired spot for indicating the overtaking speed of the aircraft relative to the target. The input terminal of blanking circuit 21 is coupled to the output terminal of a range rate circuit 23 which measures the rate of change of range to the selected target. In this manner, the overtaking speed will be indicated to the pilot as a dark spot on the range circle of the indicator. A horizontal center blanking circuit 22 has its output terminal connected to the control grid of the indicator in order to blank out the indicator for an interval each time the beam sweeps through the center as it traverses the artificial horizon. In this manner, the center of the indicator is left free from interference with the error dot and the error circle. Blanking circuit 22 has its input terminal connected to the 400-cycle reference signal source. A commutation blanking circuit 24 is coupled between circuit 11 and the control grid of the indicator in order to apply pulses from circuit 11 to the indicator to blank the indicator during the interval when the beam is moving from one of the displays to another. The input terminal of phase splitter 16 is coupled to the 400-cycle reference source, while the input terminal of phase splitter 17 is coupled to the output terminal of a range amplifier 25 which receives signals representative of the range of the selected target.

A computer caging circuit, not shown, sends a control signal to the computer which holds the gyros caged until the range to the selected target has been reduced to 2000 yards. This prevents movement of the computing gyros as the aircraft is maneuvered during the approach to the target so that no false signals will be applied from the computer to the pilot's indicator.

Figure 2:
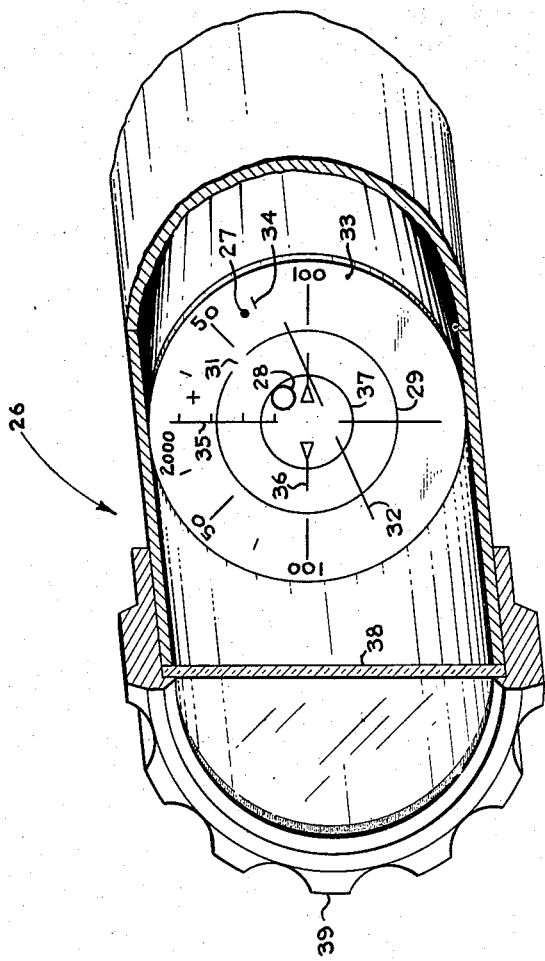
Fig. 2 is a perspective view, partly in section, of the attack display indicator.

Referring now to Fig. 2, the pilot's indicator, generally designated 26, presents a display to the pilot of radar positioning data combined with computed lead angles in a simple, usable form. The display contains no radar video signals with noise, but is a constant, high intensity indication of position, range, and rate of change of range. The signals which produce this display are generated and controlled by the circuits illustrated in Fig. 1A.

The display presents an error dot 27 which represents errors in azimuth and elevation, up to 5° at the edge of the screen, between the present pointing direction of the antenna and the computed deflection sight line during attack. An error circle 28 is also presented on the display, and represents on a non-linear scale the same information as does error dot 27. Error circle 28 appears at the edge of the screen for a deflection angle of 60° and represents the coarse target error, while error dot 27 represents the fine target error. When no pointing error exists dot 27 will be centered within circle 28 at the center of the screen of indicator 26. Target range is represented on indicator 26 by a target range circle 29 which has a maximum diameter for ranges of 2000 yards or greater and which contracts as the range is reduced below 2000 yards until, at 200 yards it coincides with the size of error circle 28. This is the minimum range for the system and, unless visual contact with the selected target has been established, it is the range at which the attack must be broken off.

Rate of change of range, or overtaking speed, appears as a dark spot 31 on range circle 29 and is read like a meter, that is, with a 0 at 12 o'clock, 100 knots closing rate at 3 o'clock, and 100 knots opening rate at 9 o'clock.

An artificial horizon produced by the vertical gyro is displayed on indicator 26 as a horizon line 32 which indicates the roll and pitch of the aircraft. It is broken at the center, as set forth above, in order to avoid optical interference with error dot 27 and error circle 28. Horizon line 32 appears on the screen of indicator 26 at all times when the system is operating. Error dot 27, error circle 28 and range circle 29 appear on the screen of indicator 26 only when a target lock-on has been secured, i. e., when the system is tracking a target.

An illuminated transparent plate 33 covering the screen of indicator 26 is provided with a scale 34 representing overtaking speed, scale 35 representing range, horizontal reference 36, and range to open fire circle 37. Accurate pointing of the guns is based on centering error dot 27 within error circle 28 and is independent of any scale markings or slope centering voltages or adjustments.

In order to provide means for adjusting the brightness of the display on indicator 26 and to insure uniform illumination at all levels of brightness, a polaroid dimmer 38 is mounted over plate 33 and is adjustable by rotating a fluted ring 39 at the periphery of indicator 26. A pilot range meter, not shown, is mounted near indicator 26, and indicates range up to 25,000 yards of a selected target when the system is tracking. The vertical gyro provides reference voltages carrying data for positioning of the aircraft with respect to vertical which is used to produce the artificial horizon and roll and pitch indication.

Referring now to Fig. 3, there is shown one form of gate generating circuit 11 for use in the indicating system of Fig. 1A. Circuit 11 comprises a clipper tube 41 coupled to a master multivibrator 42 which has its output end connected to four ring multivibrators 43, 44, 45, and 46, respectively.

Clipper tube 41 has its grid 47 connected to the 28-volt alternating-current 400-cycle reference source through a series-parallel RC network consisting of a resistor 48 and a resistor 49 in series with a shunt capacitor 51. Plate 52 of tube 41 is coupled to the +B terminal of a direct-current source, not shown, through a plate load resistor 53, while cathode 54 of tube 41 is connected to the negative or grounded terminal of the direct-current source.

Resistor 49 clips the positive peaks of the incoming sinewave, due to grid current limiting, while resistor 48 and capacitor 51 form a phase-shifting network to shift the phase of the incoming signal and minimize the effect of transients in the commutating circuits to be described below. The phase-shifted signal appearing at grid 47 of tube 41 is clipped and amplified by tube 41, which is operated as an overdriven amplifier, to produce at plate 52 of tube 41 a flat-topped wave with steep rise and fall times. This flat-topped wave is coupled to a grid 57 of the left-hand or A-section of multivibrator 42 through a differentiating circuit consisting of a capacitor 58 and a resistor 59. In this manner, a series of sharp synchronizing pips or pulses of alternate polarity appear on grid 57 of multivibrator 42.

Plate 62 of the A-section of multivibrator 42 is connected to the +B terminal of the direct-current source through a series circuit consisting of a resistor 63 and a resistor 64, while cathode 65 of the A-section is grounded. The right-hand or B-section of multivibrator 42 has its plate 66 connected to the +B terminal through a plate load resistor 67 and its cathode 68 grounded. Grid 69 of the B-section is connected to plate 62 through a capacitor 71 while grid 75 of the A-section is connected to plate 66 through a series circuit consisting of a resistor 72 and parallel connected capacitors 73 and 74, leakage resistor 75 being connected between grid 69 and cathode 68.

Multivibrator 42 is of the free-running, non-symmetrical type, the parameters of which are such that multivibrator 42 completes one free-running cycle in slightly more than three periods of the 400-cycle reference source. When synchronized by the pulses applied to grid 57, multivibrator 42 locks in at exactly one-third of the frequency of the reference source, that is 133⅓ cycles per second. Thus, multivibrator 42 is, in effect, a frequency divider with a 3 to 1 count down ratio.

In operation, referring to Fig. 7 and assuming the B-section of multivibrator 42 to be conducting, capacitors 73 and 74 discharge through resistors 59 and 72 thereby to depress the potential of grid 57 to a high negative level which cuts off the A-section of multivibrator 42. From this level, as shown at 702 in Fig. 7, grid 57 begins to rise exponentially towards +B, the slope of its rise being such that the first positive pulse of the pulse train 701 from clipper tube 41 are ineffective to drive grid 57 above cutoff, but the incidence of the second positive pulse drives grid 57 sharply above cutoff. At the incidence of the second positive synchronizing pulse, section A, therefore, conducts and the potential at plate 62, the waveform of which is designated 703, drops sharply. Capacitor 71 couples this potential to grid 69 to cut off the B-section of multivibrator 42. The exponential discharge of capacitor 71 through resistor 75 holds the B-section blocked until grid 69 rises above cutoff, whereupon the B-section again conducts. The waveform of the potential at grid 69 is designated 704 in Fig. 7. With the B-section conducting, the potential at plate 66, designated 705, falls sharply, and capacitors 73 and 74 couple this voltage drop to grid 57 to cut off the A-section. This completes one cycle of action of multivibrator 42.

The net effect of multivibrator 42 is to generate simultaneously a negative gate at plate 62 and a positive gate at plate 66, the leading edges of each gate occurring in synchronism with each second positive synchronizing pulse applied to grid 57. The differentiated output at plate 62 is applied to the ring multivibrators to synchronize their operation, while the output at plate 66 is employed to blank the indicator during commutation periods of the ring multivibrators, as set forth below.

Each of ring multivibrators 43 to 46 comprises a double section triode of the capacity-coupled, free-running type, the triodes being tied together in ring fashion so that each one triggers the succeeding triode. Since each of these multivibrators has essentially the same circuit connections, particular reference will be made only to multivibrator 43, it being understood that the other multivibrators operate in a manner identical to that of multivibrator 43, except as pointed out below.

The left-hand or A-section of multivibrator 43 has its plate 75 connected to the +B terminal of the direct-current source through a plate load resistor 76, while cathode 77 of the A-section is connected to a −250 volt potential. Grid 81 of the A-section is connected through a resistor 82 to the junction of resistors 78 and 79, at which a potential of approximately −190 volts exists, and to the plate 83 of the right-hand or B-section of multivibrator 43 through the series circuit of a resistor 84 and a capacitor 85. The B-section of multivibrator 43 has its grid 86 coupled to plate 75 of the A-section through the series circuit of a resistor 87 and a capacitor 88, and its cathode 89 connected directly to cathode 77.

Plate 83 of the B-section of multivibrator 43 is connected, through a resistor 91, to a stationary contact 92 of an electromagnetic relay, generally designated 93. Contact 92 cooperates with a movable contact 94 which is grounded and operable by electromagnet 95, for a purpose to be described below. Cathode 77 of the A-section is connected to the negative terminal of a 250-volt direct-current source, the positive terminal of this source being grounded. In this manner, resistors 78 and 79 constitute a voltage divider across the 250-volt source, and serve normally to maintain grid 81 at a positive potential with respect to cathode 77. In practice, the parameters of resistors 78 and 79 are such as to produce a potential difference of 60 volts between the junction of resistors 78 and 79 and cathode 77, hence, unless driven negative by other sources, grid 81 will draw grid current and will be only slightly positive with respect to cathode 77.

In order to limit the maximum positive potential on plate 75 of multivibrator 43, a clamping tube, generally designated 96, is provided. Clamping tube 96 has its plate 97 directly connected to plate 75 and its cathode 98 directly connected to the positive terminal of a constant source of direct-current potential. In the particular embodiment illustrated in Fig. 3, this constant source comprises a voltage regulator tube 99 having its plate 101 directly connected to the +B terminal and its cathode 102 connected to cathode 98 of clamping tube 96. The potential of cathode 102 of tube 99, and, therefore, cathode 98, is maintained at a constant positive level with respect to ground by means of a voltage divider, comprising series-connected resistors 103 and 104 connected between plate 101 and ground, and a cathode resistor 105 connected between cathode 102 and ground. The common junction of resistors 103 and 104 is connected to grid 106 of tube 99.

Similar clamping tubes 107, 108, 109 are coupled to the A-section of multivibrators 44, 45, 46, respectively, to limit the maximum positive excursion of the plates of each of these A-sections. In practice, the parameters of the voltage regulator circuit are such as to maintain the positive potential of the cathodes of the clamping tubes at a constant value of 24 volts.

It should be noted, at this point, that the plate of the A-section of multivibrator 46 is not directly connected to its clamping tube 109, but is connected to a movable contact 111 of relay 93. Contact 111 is normally disconnected, as shown in Fig. 3, but is actuated by electromagnet 95 into engagement with a stationary contact 112 which is connected to the plate of clamping tube 109. Furthermore, the plate of the B-section of multivibrator 46 is connected to contact 95 and ground through a resistor 113. Accordingly, in the condition of the circuit as shown in Fig. 3, the plate of clamping tube 109 is maintained at a positive potential of 24 volts, and the gate 4 terminal 114 is maintained at this potential to enable gate 4 to function through all conditions of operation.

In the ring multivibrator circuit illustrated there are two modes of operation, and, in order to eliminate the unwanted mode, a feedback loop is coupled between the plate of the B-section of multivibrator 44 and the grid of the B-section of multivibrator 46 through capacitor 115. Furthermore, in order to prevent any false triggering action of the multivibrator circuit from signals appearing in the other channels of the system a resistor 116 is coupled between plate 75 and gate 1 terminal 117. Terminals 118 and 119 which constitute the terminals of gates 2 and 3, respectively, are directly connected to the plates of the A-sections of multivibrators 44 and 45, respectively.

In operation, assuming the system to be in search operation at which time only artificial horizon information will be presented on the pilot's indicator, terminal 114 will be maintained at +24 volts and, as indicated below, will gate only the horizon circuit information to show both pitch and roll data on the pilot's indicator. At this time, the A-sections of multivibrators 43, 44 and 45 will be in full conduction and the plate potential of each of these sections will approach the highly negative potential of its cathode, due to the high plate load resistor in comparison to the plate resistance of the tube. Thus, plate 97 of tube 96, and the plates of tubes 107 and 108 will rest at a sufficiently negative potential to prevent actuation of gates 1 to 3. The B-section of multivibrator 46 will be conducting due to the 250-volt direct-current source and the zero bias between the grid and cathode of this section.

At the instant of lock-on relay 93 will be energized from an automatic lock-on signal source to move the contacts 94 and 111 into engagement with contacts 92 and 112, respectively. Engagement of contacts 92 and 94 effectively connects plate 83, and the plates of the B-section of multivibrators 44 and 45 to ground, while engagement of contacts 111 and 112 directly connects the plate of A-section of multivibrator 46 to terminal 114 and the plate of clamping tube 109. Accordingly, the A-section of multivibrator 46 will go into full conduction with a sufficient negative excursion to cut off the B-section. Furthermore, since the plate of the A-section is coupled to grid 81 through a capacitor 121, the negative excursion will cut off the A-section of multivibrator 43. Cutting off of the A-section of multivibrator 43 raises the potential of plate 75 and, therefore, terminal 117 to a positive value which starts gate 1. This positive value is limited to 24 volts by clamping tube 96. The waveform of the potential at terminal 117 is designated 708 in Fig. 7.

As plate 75 rises to its positive value, grid 86 also rises, and at the time grid 86 rises above cutoff, the B-section of multivibrator 43 starts conducting. The junction of resistors 63 and 64 is coupled to grid 86, and to the grid of the B-section of each of multivibrators 44 to 46 through conductor 122 and a differentiating circuit comprising a resistor 123 and a capacitor 124. Accordingly, a series of uniformly spaced sharp pulses, designated 706 in Fig. 7, will be applied to the grids of the B-sections of multivibrators 43 to 46 from master multivibrator 42. At the time of the first negative pulse from multivibrator 42, all of the B-sections except that of multivibrator 43 will be non-conducting. Accordingly, the B-section of multivibrator 43 will be cut off, the waveform of the potential at grid 86 being designated 707 in Fig. 7, and plate 83 will rise to a sufficiently high potential to cause the A-section of multivibrator 43 to again conduct. This second conduction of the A-section of multivibrator 43 lowers the potential of plate 75 to a sufficiently negative value to end gate 1. The waveform of the plate potential at plate 83 is designated 709 in Fig. 7.

The sharp decrease of potential of plate 75 is coupled to the grid of the A-section of multivibrator 44 through a capacitor 125 and a resistor 126. Accordingly, at the instant gate 1 ends, the A-section of multivibrator 44 will be cut off and the potential at terminal 118, designated 711 in Fig. 7, will rise to a positive value of 24 volts to start gate 2. The rise in the potential of terminal 118 is coupled to the grid of the B-section of multivibrator 44 and brings this grid up to cutoff, thereby starting conducting of the B-section. As the B-section of multivibrator 44 conducts the negative excursion in the plate of this section, it drives the grid of the B-section of multivibrator 46 far below cutoff, through feedback capacitor 115, to prevent the unstable mode of operation from starting.

The circuit of Fig. 3 remains in this state until the next pulse of master multivibrator 42 drives the grid of the B-section of multivibrator 44 below cutoff. Thus, gate 2 ends, and gate 3 is initiated, as shown at 712 in Fig. 7, when the A-section of multivibrator 45 becomes conducting and the A-section of multivibrator 44 becomes non-conducting. This state continues until the next synchronizing pulse of master multivibrator 44, at which time gate 4 is initiated, as shown at 713 in Fig. 7. Finally, at the instant of arrival of the fourth synchronizing pulse, the A-section of multivibrator 46 is cut off and conduction of the A-section of multivibrator 43 is again initiated through capacitor 121.

It is thus seen that the circuit of Fig. 3 discloses a ring multivibrator actuated by the master multivibrator 42 to produce a sequence of gates of equal time basis. The duration of each of the gates is equal to the total period of master multivibrator 42 and, therefore, three times the period of the reference source. Accordingly, each gate functions to provide the information on the pilot's indicator on an equal time-sharing basis, each frame lasting for 7500 microseconds.

Referring now to Fig. 4, there is shown a circuit diagram of one arrangement combining vertical deflection channel 12, vertical signal channel 14, vertical deflection amplifier 18 and the associated input circuits of each of these elements. Channel 12 comprises an elevation error amplifying section including amplifying tubes 127 and 128, a deflection section including elevation error circle cathode followers 129 and 131, elevation error dot cathode followers 132 and 133, and horizon pitch position cathode followers 134 and 135, a demodulator section including diodes 137, 138, 139, and 141, and a cathode follower section including tubes 142 and 143.

More particularly, the elevation error amplifying section includes tube 127 having its grid 144 coupled to the antenna microsyn through an isolating resistor 145 and to the computer microsyn through an isolating resistor 146. Accordingly, the input to grid 144 is a voltage proportional to the algebraic difference of the antenna elevation angle and elevation prediction angle data. The components of this voltage may be in or out of phase with each other and with respect to the 400-cycle reference voltage, depending upon flight conditions and antenna positions.

Tube 127 has its plate 147 coupled to the grid 148 of tube 128 through capacitor 149, while plate 151 of tube 128 is coupled to the cathode 152 of tube 127 through a resistor 153, to form a degenerative feedback circuit. A potentiometer 154 is connected in the grid 144 to cathode 152 circuit of tube 127 to control the signal output of the amplifying section. Plate 151 of tube 128 is coupled to the primary 155 of transformer 156 through a capacitor 157.

The input end of the deflection channel comprises a first secondary winding 158 of transformer 156 and a second center-tapped secondary winding 159 of transformer 156. Winding 158 applies elevation error information to the grid of tubes 129 and 131, while winding 159 has opposite ends respectively connected to the grids of tubes 132 and 133. Winding 159 has a greater number of turns than winding 158, in order to produce greater sensitivity for the error dot cathode followers 132 and 133 than for the error circle cathode followers 129 and 131. In practice, a turns ratio of 5 to 1 has been used to produce a deflection ratio of error dot five times that of the error circle.

The input end of pitch position cathode followers 134 and 135 is coupled to the output terminals of the gyro pitch selsyn through step-up transformer 161, a second winding 162 of transformer 161 being center-tapped and having its opposite ends respectively connected to the grids of cathode followers 134 and 135. The center-tap of winding 159 is connected to gate 1 or terminal 117 while the center-tap of winding 162 is connected to gate 4 or terminal 114. A pair of series connected resistors 163 and 164 are connected between the grids of tubes 129 and 131, the common junction of resistor 163 and 164 being connected to gate 2 or terminal 118.

In operation the cathode followers of the deflection section are normally biased sufficiently negative by the potentials appearing on their respective control grid terminals to prevent conduction. Each pair of cathode followers conduct only during the period that the positive 24-volt gate appears on its respective control grid terminal, in order to apply the elevation error information in proper sequence to the output end of the deflection channel. Common cathode resistors 165 and 166 supply signal voltage to the primary 167 of transformer 168 in the correct phase, amplitude and sequence as the cathode followers are gated.

The signal outputs appearing on winding 167 are coupled to the demodulator section which functions to peak rectify the input signals and deliver a direct-current voltage output signal which is proportional to the peak amplitude of the input signal and whose polarity is dependent on the phase of the input signal. As shown in Fig. 4, the demodulator section comprises a first full-wave rectifier including diodes 137, 138 coupled to opposite ends, respectively, of secondary winding 169 of a step-up transformer 171, through RC circuits 172 and 173. Primary winding 174 of transformer 171 is coupled to the 400-cycle reference source, the turns ratio of transformer 171 being such as to produce a voltage of 112 volts across winding 169. Diodes 137 and 138 serve to rectify the signal across winding 169 and, in the absence of any other signals, produce a zero output signal across a storage capacitor 175 which has one plate connected to diodes 137 and 138.

Winding 169 has a center-tapped terminal connected to one terminal of a secondary winding 176 of transformer 168, the other terminal of winding 176 being connected to the other plate of capacitor 175 and to the common junction of a pair of series resistors 177 and 178. Resistors 177 and 178 are connected across the −250 volt direct-current source, the parameters of resistors 177 and 178 being such as to produce a potential of −222 volts at the common junction of these resistors.

In operation, in the absence of any output signal across winding 167, diode 137 will charge capacitor 175 to a peak positive value, while diode 138 will discharge capacitor 175 to an equal peak negative value. The net resultant voltage across capacitor 175, due to rectification, will be zero, and a voltage of −222 volts will be applied to grid 179 of cathode follower tube 142. However, when a signal appears across winding 167, and therefore winding 176, a net change in voltage will be produced across capacitor 175. This net change will be proportional to the peak value of the signal across winding 176, and its polarity will be dependent upon the relative phase of this signal with respect to that of the reference signal across winding 169. The net change will then appear as a change in bias across grid 179 of tube 142.

The demodulator section comprises a second full-wave rectifier including diodes 139 and 141, this second rectifier operates in a manner similar to that of the first to produce a net change in direct-current bias across grid 181 of cathode follower tube 143. The characteristics of the demodulator section are so chosen so as to produce substantially instantaneous changes in the grid bias of tubes 142 and 143, these changes depending upon which of gates 1, 2, and 4 has been opened. In this manner, error dot, error circle, and artificial horizon pitch information will be supplied in sequence to control the bias of tubes 142 and 143, and therefore, the output of the demodulator section.

Vertical signal channel 14 comprises an error circle section including cathode follower tubes 182 and 183, a range circle section including cathode follower tubes 184 and 185, and a roll component section including cathode follower tubes 186 and 187. The function of each of the sections of channel 14 is to supply alternating current signal intelligence to vertical deflection amplifier 18. All of the sections of channel 14 are provided with a common push-pull cathode-to-cathode coupling through primary winding 188 of a transformer 189 and resistors 191 and 192 connected in series across winding 188, the common junction of resistors 191 and 192 being grounded.

In the error circle section, the grids of tubes 182 and 183 are coupled to gate 2 terminal 118 through a conductor 193 and resistors 194 and 195, respectively. In this manner, tubes 182 and 183 are held cut off, except during the interval when a positive voltage appears on terminal 118. The +24 volt potential of the gate circuit is the correct operating potential for the grids of cathode followers 182 and 183, hence the tubes function normally for 7500 microseconds and are biased beyond cutoff for 22,500 microseconds.

The 400-cycle alternating current reference source is applied to the input ends of tubes 182 and 183, through a filter circuit 196 and phase splitter 16. A potentiometer 197 is coupled between the output end of circuit 196 and the input end of splitter 16 in order to adjust the amplitude of the reference signal applied to phase splitter 16. In practice, potentiometer 197 is adjusted to fix the amplitude of the reference signal so that the error circle appearing on the indicator is equivalent to a 200 yard range circle. Output terminals 198 of phase splitter 16 are connected to the error circle section of horizontal channel 15 so that two sine-wave signals 90° out of phase are applied to the horizontal and vertical deflection plates of the indicator.

In the range circle section, the grids of tubes 184 and 185 are connected to one pair of opposite terminals, respectively, of range circle phase splitter 17, the other pair of opposite terminals 199 of phase splitter 17 being connected to the range circle section of horizontal channel 15. The input end of phase splitter 17 is connected across a center-tapped secondary winding 201 of a transformer 202, the center tap of winding 201 being connected to gate 3 terminal 119. Transformer 202 has its primary winding 203 connected between ground and a terminal 204 which is the output terminal of range amplifier 25.

In operation, under the control of gate 3, the range circle section of channel 14 applies signals to amplifier 18, through transformer 189, which produces a range circle on the indicator, the diameter of the circle varying in accordance with the range. As set forth below, amplifier 25 is so arranged that the range circle is a maximum at 2000 yards range and decreases to a minimum at 200 yards range. In addition, as set forth below, a blanking spot, derived from range rate blanking circuit 21, is placed on the range circle to indicate the rate of change of range of the target with respect to the aircraft.

In the roll component section of channel 14, the grids of tubes 186 and 187 are connected to opposite ends, respectively, of a center-tapped secondary winding 205 of a transformer 206, the center tap of winding 205 being connected to gate 4 terminal 114. Transformer 206 has its primary winding 207 connected between ground and a terminal 208, the output terminal of vertical roll selsyn. As pointed out above, a positive potential will be present on terminal 114 when relay 93 is not energized so that tubes 186 and 187 will be conducting continuously to apply artificial horizon information to the indicator. When relay 93 is energized, the potential on terminal 114 will be determined by multivibrator 46, and conduction of tubes 186 and 187 will occur in the proper sequence.

Vertical deflection amplifier 18 comprises a pair of amplifying tubes 209, 211 connected in conventional push-pull fashion and having their plates connected to the vertical deflection plates of the indicator. The cathodes of tubes 209 and 211 are coupled together through resistors 212 and 213 connected in series, the common junction of resistors 212 and 213 being connected to the —250 volt direct-current source. Grid 214 of tube 209 is connected to the output end of cathode follower tube 142 through a secondary winding 215 of transformer 189, while another secondary winding 216 connects grid 217 of tube 211 to the output end of tube 143.

In operation, two signals are applied to each of grids 214 and 217 through its respective secondary winding, one being a pulsating direct-current deflection voltage from the cathode follower section of channel 12, and the other being an alternating-current signal from channel 14. These input signals, when combined together, unbalance the potentials appearing at the plates of tubes 209 and 211 and produce a series of deflection voltages across the vertical deflection plates of the indicator.

Except for minor changes, the arrangement combining horizontal channels 13 and 15 and horizontal amplifier 19 is similar to that illustrated in Fig. 4. Accordingly, only brief reference is made here to these horizontal components to point out the various changes. In channel 13, the amplifying section is identical to that illustrated in Fig. 4, except that the input signals contain azimuth information. The horizontal deflection section of channel 13 contains no pitch position cathode follower, since horizon azimuth deflection signals are applied only to channel 15.

With the exception of the various blanking stages, there has been described all circuits necessary to present the four functions in their proper sequence on the indicator to produce the time-sharing pattern. Accordingly, reference is now made to Fig. 5 wherein is illustrated one arrangement combining blanking circuits 21, 22, 24 and range rate circuit 23.

In Fig. 5, range rate circuit 23 comprises a differentiating network, a two-stage direct-current amplifier including tubes 218, 219, a 400-cycle sweep generator including tube 222, a clamping tube 223, a coincidence circuit including twin triode 221, a series clipper 224, a range rate blanking amplifier 225 and a range rate blanking gate tube 226. Formation of the range rate gate depends upon the existence of two voltages. The first is a direct-current voltage, proportional to the rate of change of range, produced by differentiating the range voltage and applied to one section of triode 221. The second is a 400-cycle sawtooth voltage developed by tube 222 and also applied to the, as yet, unused section of tube 221.

To obtain this first voltage, the range voltage developed by the automatic tracking circuit of the radar system is applied to grid 227 of amplifier tube 218 through a differentiator circuit of which a capacitor 228 and a resistor 229 form the chief elements. If the aircraft and the target are travelling at the same speed, the range between them remains constant and the range voltage applied to grid 227 also remains constant. Under these conditions, the differentiator circuit, which develops a direct-current output voltage proportional to the rate of change of range voltage with respect to time will produce a zero voltage output. Should the aircraft be overtaking the target, the range, and, therefore, the range voltage, will diminish, and the differentiator circuit will produce a negative direct-current voltage representative of the closing speed. Similarly, should the target be outrunning the aircraft, the range and range voltage will increase, thereby resulting in a positive direct-current voltage at the differentiator output.

The differentiated range voltage, henceforth referred to as the range rate voltage, is sent through two stages of D. C. amplification using tubes 218 and 219 and the amplified range rate voltage applied to grid 224 of twin triode 221. A sawtooth sweep circuit synchronized by a 400-cycle voltage, the D. C. level of which is controlled by clamping diode 223, is applied to grid 249, the yet unused section of twin diode 221. Initially, because of the common cathode resistor 248 and applied potentials, the sawtooth section of the tube is non-conducting. However, because of the rising sweep voltage on grid 249, a coincidence point will be reached where the sawtooth section will conduct, and because of the common cathode resistor 248, the range rate voltage section will be biased beyond cutoff. At the instant that concidence is reached, the potential on plate 263 of twin triode 221 will drop because of the voltage drop across the plate load resistor 267. The point of coincidence can be controlled by potentiometer 266. The potential drop at plate 263 is differentiated by capacitor 272 in conjunction with resistor 271, clipped by series diode 224, amplified by stage 225 and applied to the grid 276 of blanking amplifier 226. The outcome of differentiating and clipping the original potential drop is to produce a negative blanking pulse occurring at the time of coincidence of the 400-cycle sweep and the range rate voltage.

To summarize, a negative blanking pulse is produced with a time delay directly proportional to a range rate voltage by utilizing the coincidence of a 400-cycle sawtooth with the range rate voltage.

Referring now to Fig. 6, two sinewave voltages 601 and 602, the phase of 601 differing from the phase of 602 by 90°, are applied to the horizontal and vertical plates, respectively, of a cathode ray tube, to give a Lissajous circle in the manner illustrated by the combination of sinewave voltages 601 and 602 to give the circle 29 of Fig. 6. A 400-cycle sawtooth 604 synchronized with voltage 601 with a direct-current level such that a zero range rate voltage will produce a range rate blanking pulse that will be oriented at the twelve o'clock position on the cathode ray tube. An arbitrary coincidence is illustrated by reference 605, Fig. 6. A blanking pulse 613a is generated at the time of occurrence of the coincidence indicated by 605, which, when combined with the composite attack cathode ray tube gating and blanking signal 613 blanks out the portion indicated by 31. The range rate blanking amplifier is only activated during gate No. 3, the time during which the range circle is being presented, hence the range rate blanking pulse can only blank a portion out of the range circle.

As illustrated by Fig. 6, it is seen that the artificial horizon 32 is made up of a vertical roll component 609 and a horizontal roll component 608, the phase difference between which will be either 0° or 180°, the phase depending upon the direction of roll. A 28 volt 400-cycle voltage of the same frequency and phase is applied to the cathode of a full wave rectifier 285 (Fig. 5) together with a direct current potential equal to that of the plates at the time gate 4 is applied. The result is a rectified sinewave 611 as illustrated in Fig. 6 which is later used to make up the composite blanking signal for the attack cathode ray tube as described below.

Finally, it is necessary to blank out the first half or sizable portion thereof of the presentation during each gate period so that starting transients and the electron beam path between different presentations will not clutter up the display. A voltage suitable for this blanking is available at plate 66 of multivibrator 42 (Fig. 3). This blanking will be henceforth referred to as changeover blanking.

To utilize the range rate blanking, artificial horizon center blanking, and changeover blanking on a single intensity grid of the cathode ray tube, it is necessary to produce a composite blanking voltage henceforth referred to as attack cathode ray tube gating and blanking. This gating and blanking signal as it exists during the tracking phase is illustrated by waveform 613 of Fig. 6.

To produce the attack cathode ray tube gating and blanking signal, section B of twin triode 226 and sections A and B of twin triode 284, Fig. 5, are used with a common plate resistor 299. Hence, it can be seen that when any of the three tubes conduct, the potential at terminal 283 will fall, producing the composite blanking desired.

The output of plate 66 multivibrator 42 is applied to terminal 302. The time constant of capacitor 303 and resistor 304 is such that the gates from multivibrator 42 will not be differentiated, i. e., grid 301 will be cutoff for the total negative portion of the cycle and during the positive portion, allow section A of tube 284 to conduct.

The range rate blanking pulse of positive polarity together with gate 3 and a bias voltage of $-250$ volts are applied to grid 276 of tube 226. Since the variation of the gating voltages is from $-225$ to $+24$ volts, the only possible time that the tube can conduct is during the time that the $+24$ volts of gate 3 is applied. However, with the $-250$ volt bias, the voltage between resistors 278 and 279 is still beyond cutoff except when the positive range rate blanking pulse is applied, driving the grid 276 positive and resulting in the tube conducting with a corresponding voltage drop across resistor 299 appearing at terminal 283. The range rate blanking pulse is illustrated by 613a as a part of the composite attack cathode ray tube blanking and gating signal 613.

The artificial horizon center blanking (waveform 611, Fig. 6) voltage is applied to grid 288 of tube 284 along with gate 4. Reference line 612 represents the grid cutoff for section B, tube 284. Hence, when waveform 611 is applied to the grid of section B, tube 284, conduction takes place during the time, as illustrated, on waveform 611, Fig. 6, from *d* to *e* to *f* and from *h* to *a* to *b* and does not conduct from *b* to *c* to *d* and from *f* to *g* to *h* as the grid is dropped below cutoff by the negative swing of the 28 volt 400-cycle rectified voltage. During the negative portion of gate 4, section B, tube 284 is biased beyond cutoff and no conduction takes place. Hence, during the time that gate 4 is applied to the grid of section B, tube 284, artificial horizon blanking pulses will be produced during the conduction periods of section B, tube 284 illustrated as *d* to *e* to *f* and *h* to *a* to *b*, signal 611, Fig. 6.

The composite output at terminal 283 during the tracking phase is a blanking signal comprising the sum of the individual range rate blanking 613–*a* during gate 3, artificial horizon blanking 613–*b* during gate 4 and the changeover blanking for each gate. This composite signal is illustrated by waveform 613, Fig. 6, and is applied to the intensity grid of the attack cathode ray tube.

Should the subject radar fire control system be in the search phase, gate 4 will be on continuously and artificial horizon blanking 613-b will appear at every gate of the attack cathode ray tube blanking and gating signal 613.

Considering now the operation of the display circuit of this invention in the airborne fire control system, it has been shown that artificial horizon information will be presented continuously on pilot's indicator 26 during normal flight and during the search phase of operation of the equipment. Thus, the pilot's attention is directed to indicator 26, and he will be readily cognizant of lock-on, or the beginning of the attack phase. In this manner, the present invention overcomes one of the primary difficulties of prior art airborne radar systems, namely, the failure of the pilot to follow the radar indications due to his complete concentration upon keeping the aircraft aloft.

When lock-on occurs, the pilot notices the error circle on his indicator, this circle being displaced from the center of indicator 26 in accordance with the relative angular position of the target and the longitudinal axis of the aircraft. The pilot then maneuvers the aircraft so that the error circle deflects toward the center of the indicator. When the pointing error has been reduced to 5°, the error dot will appear on the indicator, and the pilot continues to maneuver the aircraft until both the error dot and the error circle are positioned in alignment at the center of the screen. Since the central portion of the artificial horizon has been blanked out, as set forth above, no interference will result between the artificial horizon indications and the error dot and error circle indications.

During the interval during which the pilot maneuvers the aircraft to align the error dot and error circle, range and range rate information will also be presented on the indicator in the form of the range circle and the blanked spot thereon. As pointed out above, the range circle will have a maximum diameter for ranges of 2000 yards or greater, and will contract as the range is reduced. Furthermore, the position of the blanked spot on the range circle indicates the rate of change of range, i. e., whether the aircraft is approaching or moving away from the target. Accordingly, the pilot may adjust the speed of the aircraft to an optimum closing rate.

It should be emphasized that, although individual channels are used for each presentation, the pilot sees all of the presentations simultaneously on the indicator. This results from the fact that each presentation occurs 33 times per second, together with the pilot's visual persistence in conjunction with the persistence of the cathode ray tube screen.

When the error circle and the error dot are aligned at the center of the indicator, the computer gyro caging is released, in order to apply the computed prediction angle data to the error circle and error dot presentations. Accordingly, uncaging of the computer will deflect the error circle and the error dot, and the pilot proceeds to maneuver the aircraft to again align the error circle and the error dot at the center of the indicator. At the point of realignment, the aircraft will be headed along the disturbed line of sight required for a lead pursuit course, as indicated in Fig. 9.

When the target range is reduced to 800 yards, the range circle will coincide with the range to open fire circle 37 inscribed on plate 33. This is the maximum firing range, and is a signal to the pilot that the guns may be fired. If the aircraft continues to approach the target, the range circle will continue to contract until it coincides with the error circle which represents a range of 200 yards. This is the minimum firing range of the system and, unless the pilot has established visual contact with the target, he should break off the attack.

Although the fire control system of the present invention is designed primarily for two-place aircraft, it may be used in a single-seater craft. In addition, for single-seater craft, the indicator may be arranged to present both conventional radar search information, together with the attack display outlined above. In this instance, the search display will be present until the pilot locates and locks-on to the target, after which the attack display 26 will appear automatically.

What is claimed as new is:

1. A radar disturbed line-of-sight fire control system for directing an attacker craft to a target on a lead pursuit course, said system comprising: radar means for locating, locking-on and tracking the target, said radar means producing individual electrical signals representing range, azimuth, and elevation of the target relative to the craft; computer means on the craft coupled to said radar means being responsive to said range signal for producing electrical signals indicative of azimuth and elevation components of said lead pursuit course for the craft with respect to the target; circuit means electrically coupled to said radar and computer means for combining said signals representing azimuth and elevation of the target relative to the craft, respectively, with the azimuth and elevation components of said lead pursuit course to produce resultant signals representative of azimuth and elevation lead angle errors indicative of deviations of the course of the craft from said lead pursuit course; a cathode ray tube having a screen and horizontal and vertical deflection control elements; rectifying means for converting said resultant signals representative of azimuth and elevation errors into direct-current components; and means for electrically connecting said rectifying means to said horizontal and vertical deflection control elements, respectively, to produce a dot on said screen, the position of said dot with respect to a predetermined reference point on said screen being indicative of deviations of the course of the craft from said lead pursuit course.

2. A radar disturbed line-of-sight fire control system for directing an attacker craft to a target on a lead pursuit course, said system comprising radar means for locating, locking-on and tracking the target, said radar means producing individual electrical signals representing range, range-rate, azimuth and elevation of the target relative to the craft; computer means on the craft coupled to said radar means, said computer means being responsive to said range signal for producing electrical signals indicative of azimuth and elevation components of said lead pursuit course for the craft with respect to the target; circuit means electrically coupled to said radar and computer means for combining said signals representing azimuth and elevation of the target relative to the craft, respectively, with the azimuth and elevation components of said lead pursuit course to produce resultant signals representative of azimuth and elevation errors indicative of deviations of the course of the craft from said lead pursuit course; a cathode ray tube having a screen; and additional circuit means coupled between said cathode ray tube and said circuit means and said radar means electrically and cyclically connecting said radar and circuit means to said cathode ray tube to produce a visual indication of said azimuth and elevation error signals, said range-rate signal, and said range signal.

3. A radar disturbed line-of-sight fire control system for directing an attacker craft to a target on an attack course, said system comprising tracking means for producing individual electrical signals representing range, azimuth and elevation of the target relative to the craft; computing means on the craft coupled to said tracking means and responsive to said range signal for producing electrical signals indicative of azimuth and elevation components of said attack course for the craft with respect to the target; circuit means coupled to said tracking and computer means for combining said signals representing azimuth and elevation of the target relative to the craft, respectively, with said signals indicative of azimuth and elevation components of said attack course to produce resultant signals representative of azimuth and elevation errors indicative of deviations of the course of the craft from said attack course; a cathode ray tube having a screen; and additional circuit means coupling said cathode ray tube to said circuit means and to said tracking means for cyclically connecting said tracking and circuit means to said cathode ray tube to produce on said screen a visual indication of said resultant azimuth and elevation error signals and of said range signal.

4. Apparatus for indicating the magnitude of an electrical signal comprising a cathode ray tube having a screen, an intensity control element for controlling the intensity of the electron beam of said tube, and horizontal and vertical deflection control elements for controlling the deflection of the electron beam; first circuit means for producing first and second alternating potentials equal in period and substantially equal in magnitude and differing by substantially ninety degrees in phase; means for applying said first and second alternating potentials to said horizontal and vertical deflection control elements, respectively, to cause the electron beam to trace a substantially circular path on said screen; a second circuit means for producing a linear sweep potential having a period equal to the period of said first and second potentials produced by said first circuit means; third means coupled to second circuit means responsive to said linear sweep potential and to said electrical signal for producing a marker potential at the time of occurrence of coincidence in magnitude between said electrical signal and said linear sweep potential, said marker potential being delayed with respect to the time at which said linear sweep potential has a predetermined value, by an interval of time proportional to the magnitude of said electrical signal; and further means coupled between said third circuit means and said intensity control elements for applying said marker potential to said intensity control element to produce an indication on the substantially circular trace produced by the electron beam on said screen, the position of said indication on said substantially circular trace relative to said reference point being determined by the magnitude of said electrical signal.

5. The combination as defined in claim 4 wherein said further means includes means for increasing the intensity of the electron beam on said screen to produce an illuminated indication.

6. The combination as defined in claim 4 wherein said further means includes means for decreasing the intensity of the electron beam on said screen.

7. Apparatus for indicating the magnitude of an electrical signal, comprising a cathode ray tube having a screen, an intensity control element for controlling the intensity of the electron beam of said tube, and horizontal and vertical deflection control elements for controlling the deflection of the electron beam; a first circuit means for producing first and second alternating potentials equal in period and substantially equal in magnitude and differing by substantially ninety degrees in phase; means coupled between said first circuit means and said deflection control elements for applying said first and second alternating potentials to said horizontal and vertical deflection control elements, respectively, to cause the electron beam to trace a substantially circular path on said screen; second circuit means for producing a linear sweep potential of adjustable direct-current level and having a period equal to the period of said first and second alternating potentials produced by said first circuit means; third circuit means responsive to said linear sweep potential and said electrical signal coupled to said second circuit means for producing a marker potential at the time of occurrence of coincidence in magnitude between said electrical signal and said linear sweep potential, said marker potential being delayed with respect to the time at when said linear sweep potential has a predetermined value by an interval of time proportional to the magnitude of said electrical signal; and additional means coupled between said third circuit means and said intensity control elements for applying said marker potential to said intensity control element to produce an indication on the substantially circular trace on said screen produced by the electron beam, the position of said indication on said substantially circular trace relative to said reference point being determined by the magnitude of said electrical signal and said direct-current level and the rate of change of said linear sweep potential determining the zero adjustment and calibration, respectively of said indication on said substantially circular trace.

8. In a radar fire control system of the type which produces alternating current azimuth and elevation error signals representing the instantaneous angular deviation of the course of an attacking craft from an attack course to a target, a time-sharing indicating system comprising rectifying means for converting said alternating current azimuth and elevation error signals into direct-current azimuth and elevation error components, respectively; first means for providing first and second alternating potentials having substantially equal amplitude and frequency and differing substantially ninety degrees in phase; circuit means coupled to said rectifying means and to said first means for adding, respectively, said first and second alternating potentials, and equal fractional portions of said direct-current azimuth and elevation error components to provide resultant signals; a cathode ray tube having a screen, and horizontal and vertical deflection control elements; a first and a second circuit, and second means electrically coupled to said first and second circuits for periodically and sequentially coupling said first and second circuits to said deflection control elements, said first circuit being connected to said rectifying means for periodically applying said error components to said deflection control elements to produce a dot on said screen, the position of said dot relative to a predetermined reference point on said screen being indicative of said instantaneous angular deviation, and said second circuit being coupled to said circuit means for periodically applying said resultant signals to said deflection control elements to produce a circle on said screen, said circle being disposed with respect to said predetermined reference point and relative to said dot in accordance with said equal fractional portions of said azimuth and elevation error components to represent said fractional portion of said instantaneous angular deviation.

9. In a radar fire control system of the type which produces alternating current azimuth and elevation error signals representative of the instantaneous angular deviation of the course of an attacking craft from an attack course to a target, and a signal indicative of the range from the craft to the target, a time-sharing indicating system comprising rectifying means for converting said alternating current azimuth and elevation error signals into direct-current azimuth and elevation error components, respectively; first means for providing first and second alternating potentials having substantially equal amplitude and frequency, and differing substantially ninety degrees in phase; first circuit means coupled to said rectifying means and to said first means for adding, respectively, said first and second alternating potentials, and equal fractional portions of said direct-current azimuth and elevation error components to provide resultant signals; second circuit means responsive to said range signal for producing first and second alternating current range signals, said first and second alternating current range signals being substantially equal in magnitude and frequency and differing substantially ninety degrees in phase, said alternating current range signals having a magnitude representative of said range signal, said first and second alternating potentials having an amplitude that is small compared to that of said alternating current range signals; a cathode ray tube having a screen, and horizontal and vertical deflection control elements; a first circuit, a second circuit, a third circuit; and second means electrically coupled to said first, second and third circuits for periodically and sequentially coupling said circuits to said deflection control elements, said first circuit being connected to said rectifying means for periodically applying said error components to said deflection control elements to produce a dot on said screen, the position of said dot relative to a predetermined reference point on said screen being indicative of said instantaneous angular deviation, said second circuit being coupled to said first circuit means for periodically applying said resultant signals to said deflection control elements to produce a small circle on said screen, said small circle being disposed with respect to said predetermined reference point and relative to said dot in accordance with said equal fractional portions of said azimuth and elevation error components to represent said fractional portion of said instantaneous angular deviation, and said third circuit being coupled to said second circuit means for periodically applying said first and second range signals to said deflection control elements to produce a large illuminated circle on said screen having a diameter proportional to the range from the craft to the target.

10. In a radar fire control system of the type which produces a first signal representing the range of a target from an attacking craft, a second signal representing the attitude of the craft, and third and fourth signals representing the instantaneous azimuth and elevation of the target with respect to the craft, computing means on the craft and responsive to said first, third and fourth signals for producing a fifth signal representing the instantaneous angular deviation of the course of the craft from an attack course to the target; and a time-sharing indicating system comprising a cathode ray tube having a screen and a plurality of deflection control elements; a first, a second and a third circuit; means electrically coupled to said first, second and third circuits for periodically and sequentially coupling said circuits to said deflection control elements, said first circuit being responsive to said first signal for periodically energizing said deflection control elements to visually indicate the target range on said screen, said second circuit being responsive to said second signal for periodically energizing said deflection control elements to visually indicate the attitude of the craft on said screen, and said third circuit being coupled to said computing means and responsive to said fifth signal for periodically energizing said deflection control elements to visually indicate the instantaneous angular deviation of the course of the craft from the attack course to the target.

11. In a tracking system of the type which produces a first signal representing the range of a target from an attacker craft, differentiating means responsive to said first signal for producing a second signal representative of the rate of change of the range of the target with respect to the craft, a cathode ray tube having a screen, first circuit means responsive to said first signal and coupled to said cathode ray tube to produce a visual indication comprising a circle the diameter of which indicates the range of the target with respect to the craft on said screen, and second circuit means coupled between said differentiating means and said cathode ray tube to produce a visual indication comprising a blanked out portion of said circle with the position of said blanked out portion indicating the rate of change of the range of the target with respect to the craft on said screen.

12. A radar disturbed line-of-sight fire control system for directing an attacker craft to a target on a lead pursuit course, comprising radar means for locating, locking-on and tracking the target, said radar means producing individual electrical signals representing range, range-rate, azimuth and elevation of the target relative to the craft; computer means coupled to said radar means and responsive to said range signal for producing electrical signals indicative of azimuth and elevation components of said lead pursuit course for the craft with respect to the target; combining circuit means electrically coupled to said radar and computer means to receive and combine said signals representing azimuth and elevation of the target relative to the craft produced by said radar means, respectively, with said signals indicative of the azimuth and elevation components of said lead pursuit course produced by said computer means; said circuit means, in response to said signals impressed thereon, generating resultant signals representative of azimuth and elevation errors indicative of deviation of the course of the craft from said lead pursuit course; vertical gyro means on the craft for producing a signal for indicating an artificial horizon; a cathode ray tube having a screen; and periodic switch means coupled between said cathode ray tube and said combining circuit means, said radar means and said vertical gyro means for cyclically connecting said radar, combining circuit and vertical gyro means to said cathode ray tube to produce on said screen a visual indication of said resultant azimuth and elevation error signals, said range signal, and said signal for indicating an artificial horizon.

13. A radar search and tracking system, said system comprising first means for locating, locking-on and tracking a target, said first means producing an electrical signal in the tracking phase representing the range of the target from the system, a cathode ray tube having a screen, an electron gun including an intensity control element, and horizontal and vertical deflection control elements; second means coupled to said first means and responsive to said signal representative of the range of the target from the system for producing first and second alternating current range signals, equal in frequency and differing substantially ninety degrees in phase, said first and second alternating current range signals having substantially equal magnitudes representative of the range of the target from the system; and further means coupled between said second means and said deflection control elements for impressing said first and second alternating current range signals on said horizontal and vertical deflection control elements, respectively, to produce an illuminated circle on said screen, having a diameter proportional to the range of the target from the system; differentiating means coupled to said first means and continuously responsive to said signal representative of the range of the target from the craft for producing a range-rate signal proportional to the rate of change of the range of the target with respect to the craft; and additional means electrically coupled between said differentiating means and said intensity control element for applying a signal representative of said range rate signal to said intensity control element to blank out a portion of the illuminated range circle, the blanked out portion being so positioned as to indicate the rate of change of the range of the target with respect to the craft.

14. The system defined in claim 13 wherein said additional means electrically coupled between said differentiating means and said intensity control element comprises first circuit means for producing a linear sweep potential having a period equal to the period of said first and second range signals; and second circuit means for producing a blanking pulse at the time of coincidence in magnitude between said range-rate signal and said linear sweep potential, and said blanking pulse being delayed from the instant of time said linear sweep has a predetermined potential by an interval of time proportional to the magnitude of said range-rate signal.

15. The system defined in claim 14 wherein said first circuit means for producing a linear sweep potential includes additional circuit means to manually adjust the direct-current level of said linear sweep potential, said direct-current level determining the zero setting of said blanking pulse.

(References on following page)

References Cited in the file of this patent

UNITED STATES PATENTS

| | | |
|---|---|---|
| 2,405,231 | Newhouse | Aug. 6, 1946 |
| 2,422,697 | Meacham | June 24, 1947 |
| 2,436,655 | Locke | Feb. 24, 1948 |
| 2,451,632 | Oliver | Oct. 19, 1948 |
| 2,590,114 | McVay | Mar. 25, 1952 |
| 2,600,209 | Cole | June 10, 1952 |
| 2,649,581 | Tasker et al. | Aug. 18, 1953 |
| 2,715,219 | Otto et al. | Aug. 9, 1955 |
| 2,737,652 | White et al. | Mar. 6, 1956 |